US012192378B2

(12) United States Patent
Li et al.

(10) Patent No.: US 12,192,378 B2
(45) Date of Patent: Jan. 7, 2025

(54) DATA PROCESSING METHOD AND APPARATUS, DEVICE, AND STORAGE MEDIUM

(71) Applicant: TENCENT TECHNOLOGY (SHENZHEN) COMPANY LIMITED, Shenzhen (CN)

(72) Inventors: Maocai Li, Shenzhen (CN); Zongyou Wang, Shenzhen (CN); Yifang Shi, Shenzhen (CN); Zhiyong Liao, Shenzhen (CN); Pan Liu, Shenzhen (CN); Hu Lan, Shenzhen (CN); Kaiban Zhou, Shenzhen (CN); Li Kong, Shenzhen (CN); Gengliang Zhu, Shenzhen (CN); Qucheng Liu, Shenzhen (CN); Jinsong Zhang, Shenzhen (CN); Huankun Huang, Shenzhen (CN); Jiahui Cui, Shenzhen (CN)

(73) Assignee: TENCENT TECHNOLOGY (SHENZHEN) COMPANY LIMITED, Shenzhen (CN)

( * ) Notice: Subject to any disclaimer, the term of this patent is extended or adjusted under 35 U.S.C. 154(b) by 203 days.

(21) Appl. No.: 18/076,689

(22) Filed: Dec. 7, 2022

(65) Prior Publication Data
US 2023/0097738 A1 Mar. 30, 2023

Related U.S. Application Data

(63) Continuation of application No. PCT/CN2022/078155, filed on Feb. 28, 2022.

(30) Foreign Application Priority Data

Mar. 2, 2021 (CN) .......................... 202110227288.6

(51) Int. Cl.
H04L 29/06 (2006.01)
H04L 9/00 (2022.01)
H04L 9/32 (2006.01)

(52) U.S. Cl.
CPC .............. *H04L 9/3247* (2013.01); *H04L 9/50* (2022.05)

(58) Field of Classification Search
CPC ................................ H04L 9/3247; H04L 9/50
See application file for complete search history.

(56) References Cited

U.S. PATENT DOCUMENTS 10,892,900 B2* 1/2021 Sun ....................... H04L 9/3263
2017/0041148 A1 2/2017 Pearce
(Continued)

FOREIGN PATENT DOCUMENTS

CN 107453870 A 12/2017
CN 109635585 A 4/2019
(Continued)

OTHER PUBLICATIONS

China National Intellectual Property Administration (CNIPA) Office Action 1 for 202110227288.6 Apr. 16, 2021 10 Pages (including translation).
(Continued)

*Primary Examiner* — Evans Desrosiers
(74) *Attorney, Agent, or Firm* — Anova Law Group, PLLC

(57) ABSTRACT

A data processing method includes: transmitting, by a first service node, service data information to a second service node, so that the second service node obtains data signature information; a first key parameter and a second key parameter that are both related to a random parameter; the random parameter being determined by the second service node based on a node private key and the service data informa-
(Continued)

tion; performing signature verification on the received data signature information based on the first key parameter and the second key parameter, and adding a signature verification result obtained after signature verification to a verification result set; searching for a target signature verification result that satisfies a valid verification condition from the verification result set; and performing aggregate signature on the data signature information obtained after calculation when a quantity of signatures of the target signature verification result satisfies an aggregate signature condition.

20 Claims, 9 Drawing Sheets

(56) References Cited

U.S. PATENT DOCUMENTS

| | | | | |
|---|---|---|---|---|
| 2020/0389321 | A1* | 12/2020 | Fletcher | H04L 9/0618 |
| 2022/0247573 | A1* | 8/2022 | Li | H04L 9/3252 |
| 2022/0337429 | A1 | 10/2022 | Qiu et al. | |

FOREIGN PATENT DOCUMENTS

| | | |
|---|---|---|
| CN | 110247774 A | 9/2019 |
| CN | 110300172 A | 10/2019 |
| CN | 111209334 A | 5/2020 |
| CN | 111385096 A | 7/2020 |
| CN | 111427957 A | 7/2020 |
| CN | 111445334 A | 7/2020 |
| CN | 111478775 A | 7/2020 |
| CN | 111628868 A | 9/2020 |
| CN | 112600671 A | 4/2021 |

OTHER PUBLICATIONS

The World Intellectual Property Organization (WIPO) International Search Report for PCT/CN2022/078155 Mar. 29, 2022 6 Pages (including translation).
Schnorr C P, "Efficient signature generation by smart cards". 1991, 4(3): p. 161-174, Journal of cryptology.
Schnorr C P, "Efficient identification and signatures for smart cards"., 1989: p. 239-252, Conference on the Theory and Application of Cryptology, New York, NY: Springer.
"Schnorr signature algorithm and aggregate signature", https://blog.csdn.net/shangsongwww/article/details/101301727.
"Introduction to Schnorr Signatures", https://www.jianshu.com/p/3df3f16ea852.

* cited by examiner

DATA PROCESSING METHOD AND APPARATUS, DEVICE, AND STORAGE MEDIUM

CROSS-REFERENCES TO RELATED APPLICATIONS

This application is a continuation application of PCT Patent Application No. PCT/CN2022/078155, filed on Feb. 28, 2022, which claims priority to Chinese Patent Application No. 202110227288.6, entitled "DATA PROCESSING METHOD AND APPARATUS, DEVICE, AND STORAGE MEDIUM" filed on Mar. 2, 2021, the entire contents of both of which are incorporated herein by reference.

FIELD OF THE TECHNOLOGY

The present disclosure relates to the field of blockchain technologies, and in particular, to a related data processing technology.

BACKGROUND OF THE DISCLOSURE

In a digital signature application, sometimes a plurality of signers are required to sign a plurality of messages or the same message, and such operation may be referred to as multi-signature or aggregate signature.

In an application scenario of the multi-signature, when an aggregator who participates in the aggregate signature receives data signature information corresponding to a to-be-signed message transmitted by another signer, the aggregator may perform the aggregate signature on the data signature information to obtain aggregate signature information corresponding to the to-be-signed message. Each signer needs to perceive all signers (for example, service nodes in a blockchain network) participating in the aggregate signature in advance when performing signature processing on the to-be-signed message, so as to participate in the aggregate signature to obtain the data signature information corresponding to the to-be-signed message.

For example, assuming that all signers participating in the aggregate signature include a service node 1, a service node 2 and a service node 3 in the blockchain network, then for any one of the signers (for example, the service node 1), after receiving the to-be-signed message, the signer is required to obtain interaction data (such as a key parameter $R_1$ generated by the service node 1 itself, a key parameter $R_2$ transmitted by the service node 2 and a key parameter $R_3$ transmitted by the service node 3) of all the signers, so as to perform signature processing on the to-be-signed message to obtain the data signature information.

In the foregoing aggregate signature scheme, there exists a relatively large amount of network interaction between the signers during a process of performing signature processing on the to-be-signed message, so that the aggregate signature scheme has relatively high network complexity, which takes up a relatively large amount of bandwidths and reduces a signature efficiency of the aggregate signature.

SUMMARY

Embodiments of the present disclosure provide a data processing method and apparatus, a device and a storage medium, which can reduce network complexity of aggregate signature.

According to one aspect of the embodiments of the present disclosure, a data processing method is provided, performed by a first service node in a blockchain network, the method including: obtaining service data information, and transmitting the service data information to a second service node, the second service node being a node other than the first service node in the blockchain network; receiving data signature information returned by the second service node, the data signature information being obtained by the second service node through performing signature processing on the service data information; the data signature information including a first key parameter and a second key parameter that are both related to a random parameter; the random parameter being determined by the second service node based on both a node private key and the service data information; performing signature verification on the data signature information based on the first key parameter and the second key parameter in the data signature information, to obtain a signature verification result, and adding the signature verification result to a verification result set associated with the blockchain network; searching for a signature verification result that satisfies a valid signature verification condition from the verification result set, and determining the signature verification result that satisfies the valid signature verification condition as a target signature verification result; and performing aggregate signature on the data signature information corresponding to the target signature verification result when a quantity of signatures of the target signature verification result satisfies an aggregate signature condition.

According to one aspect of the embodiments of the present disclosure, a data processing method is provided, performed by a second service node in a blockchain network, the method including: receiving service data information transmitted by a first service node of the blockchain network; generating, based on a node private key of the second service node and the service data information, a random parameter used for performing signature processing on the service data information; generating a first key parameter based on the random parameter and a fixed parameter, generating a second key parameter based on the random parameter, the service data information, and the node private key, and determining data signature information based on the first key parameter and the second key parameter; and transmitting the data signature information to the first service node.

According to one aspect of the embodiments of the present disclosure, a data processing apparatus is provided, including: a service information obtaining module, configured to obtain service data information and transmit the service data information to a second service node, the second service node being a node other than the first service node in a blockchain network; a signature information receiving module, configured to receive data signature information returned by the second service node, the data signature information being obtained by the second service node through performing signature processing on the service data information; the data signature information including a first key parameter and a second key parameter that are both related to a random parameter; the random parameter being determined by the second service node based on both a node private key and the service data information; a verification result adding module, configured to perform signature verification on the data signature information based on the first key parameter and the second key parameter in the data signature information to obtain a signature verification result, and add the signature verification result to a verification result set associated with the blockchain network; a verification result searching module, configured to search for a signature verification result that satisfies a valid signature verification condition from the verification result set, and determine the signature verification result that satisfies the valid signature verification condition as a target signature verification result; and an aggregate signature module, configured to perform aggregate signature on data signature information corresponding to the target signature verification result when a quantity of signatures of the target signature verification result satisfies an aggregate signature condition.

According to one aspect of the embodiments of the present disclosure, a data processing apparatus is provided, including: a service information receiving module, configured to receive service data information transmitted by a first service node in a blockchain network; a random parameter generation module, configured to generate a random parameter used for performing signature processing on the service data information, based on a node private key of a second service node and the service data information; a signature information determination module, configure to generate a first key parameter based on the random parameter and a fixed parameter, generate a second key parameter based on the random parameter, the service data information, and the node private key, and determine data signature information based on the first key parameter and the second key parameter; and a signature information transmission module, configured to transmit the data signature information to the first service node.

According to one aspect of the embodiments of the present disclosure, a computer device is provided, including: a processor and a memory, the processor being connected to the memory, the memory being configured to store a computer program, and the computer program, when executed by the processor, causing the computer device to perform the method according to the embodiments of the present disclosure.

According to one aspect of the embodiments of the present disclosure, a non-transitory computer-readable storage medium is provided, the computer-readable storage medium storing a computer program, the computer program being adapted to be loaded and executed by a processor to cause a computer device including the processor to perform the method according to the embodiments of the present disclosure.

In the embodiments of the present disclosure, after receiving the service data information transmitted by the first service node, the second service node in the blockchain network does not need to perceive an existence of another signer, and may directly perform signature processing on the received service data information to obtain the data signature information to be returned to the first service node. The data signature information determined by the second service node may include the first key parameter and the second key parameter. Since the two key parameters are both related to the random parameter generated by the second service node, there is no need to determine the first key parameter based on interaction data returned by all signers, thereby reducing network interaction. The random parameter is determined based on both the node private key of the second service node and the service data information. The first service node in the blockchain network can obtain data signature information obtained by a plurality of second service nodes through performing signature processing on the same service data information, so as to perform signature verification on each obtained data signature information to obtain the signature verification result of each data signature information, and add the obtained signature verification result to the verification result set associated with the blockchain network. The first service node may search for the target signature verification result that satisfies the valid verification condition from the verification result set, and calculate the quantity of signatures of the target signature verification result. When the quantity of signatures satisfies the aggregate signature condition, the first service node may directly perform aggregate signature on the data signature information corresponding to the target signature verification result. During an entire aggregate signature process, since a signer does not need to perceive an existence of another signer, the signer can directly perform signature processing on the received service data information, so as to reduce network interaction between signers in a signature process, thereby reducing network complexity of aggregate signature and improving signature efficiency of aggregate signature.

DESCRIPTION OF EMBODIMENTS

Figure 1:
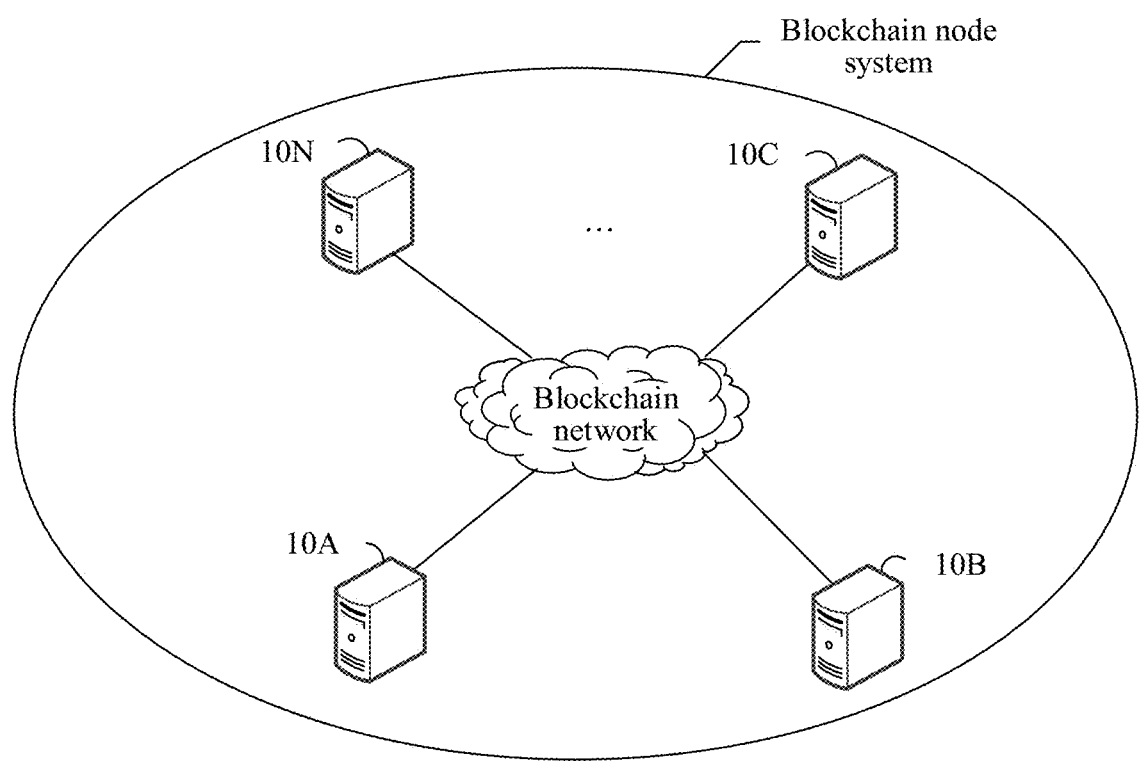
FIG. 1 is a schematic structural diagram of a blockchain node system according to an embodiment of the present disclosure.

FIG. 1 is a schematic structural diagram of a blockchain node system according to an embodiment of the present disclosure. As shown in FIG. 1, the blockchain node system may be a distributed system formed by connecting a plurality of nodes through network communication. The blockchain node system may include a plurality of nodes. The plurality of nodes may specifically be a node 10A, a node 10B, a node 10C, . . . , and a node 10N. In this embodiment of the present disclosure, each node (such as, the node 10A, the node 10B, the node 10C, . . . , or the node 10N) in a blockchain network may be collectively referred to as a blockchain node. It is to be understood that the blockchain node may be a server accessing the blockchain network, or may be a user terminal accessing the blockchain network. A specific form of the blockchain node is not limited herein.

It is to be understood that these blockchain nodes may be used for maintaining the same blockchain network, and a peer-to-peer (P2P) network may be formed between any two blockchain nodes in the blockchain network. The P2P network may adopt a P2P protocol, and the P2P protocol is an application-layer protocol running over a transmission control protocol (TCP).

A data processing method in this embodiment of the present disclosure may relate to a non-interactive aggregate signature scheme (for example, a Schnorr algorithm). The non-interactive aggregate signature scheme may effectively lower storage space, reduce network traffic, and shorten verification time, which has an obvious effect on a scenario with a relatively low signature frequency but a relatively high verification frequency. For example, the aggregate signature scheme may be applied to a consensus scenario, a multi-party collaboration scenario, a contract signing scenario, and the like. The aggregate signature herein is a type of multi-signature, and the multi-signature refers to aggregating, after obtaining a plurality of signature information obtained after a plurality of signers perform signature processing on a plurality of messages or the same message, the plurality of signature information into relatively short signature information, so as to obtain aggregate signature information. A verifier ensures reality of a received message through verifying the aggregate signature information.

For ease of understanding, in this embodiment of the present disclosure, one blockchain node may be selected in the blockchain node system shown in FIG. 1 as a first service node, for example, a node 10A. The first service node may serve as an aggregator participating in the aggregate signature. In addition, in this embodiment of the present disclosure, a node other than the first service node in the blockchain node system may be regarded as a second service node, and the second service node may be used for performing signature processing on service data information broadcast by the first service node, that is, the second service node may serve as a signer participating in the aggregate signature. The service data information broadcast by the first service node may be a transaction request message of a client, or may be a to-be-verified block obtained by performing packing processing on the transaction request message. The service data information is not limited herein. The client may include a social client, a multimedia client (for example, a video client), an entertainment client (for example, a game client), an education client, a livestreaming client and the like; and the client may be an independent client, or may be an embedded sub-client which is integrated in a certain client (such as the social client, the education client, or the multimedia client), which is not limited herein.

It is to be understood that a user terminal on which a client runs may be directly or indirectly connected to the blockchain node (for example, the first service node) in the blockchain network through a wired or wireless communication method, to perform service data interaction, which is not limited in this embodiment of the present disclosure. The user terminal may include a smart terminal such as a smart phone, a tablet computer, a notebook computer, a desktop computer, a wearable device, a smart home or a head-mounted device. The first service node in this embodiment of the present disclosure may be a backend server corresponding to the client. The first service node may be an independent physical server, or may be a server cluster including a plurality of physical servers or a distributed system, or may be a cloud server providing basic cloud computing services, such as a cloud service, a cloud database, cloud computing, a cloud function, cloud storage, a network service, cloud communication, a middleware service, a domain name service, a security service, a content delivery network (CDN), big data, and an artificial intelligence platform.

In this embodiment of the present disclosure, the first service node may transmit the service data information to the second service node (that is, the signer) in the blockchain network, so that the second service node performs signature processing on the service data information. When receiving the service data information, the second service node does not need to perceive an existence of another signer and may obtain, based on a node private key of the second service data information itself and the service data information, a random parameter used for generating a first key parameter and a second key parameter, thereby obtaining data signature information corresponding to the service data information. In this way, network interaction during a process of the aggregate signature may be reduced. After receiving the data signature information returned by the second service node, the first service node may perform signature verification on the data signature information, so as to calculate a quantity of signatures of a target signature verification result that satisfies a valid verification condition, to perform the aggregate signature on the data signature information corresponding to the target signature verification result when the quantity of signatures of the target signature verification result satisfies an aggregate signature condition. Since the network interaction between signers during a signature process is reduced, network complexity of the aggregate signature may be reduced, thereby improving signature efficiency of the aggregate signature.

Figure 2:
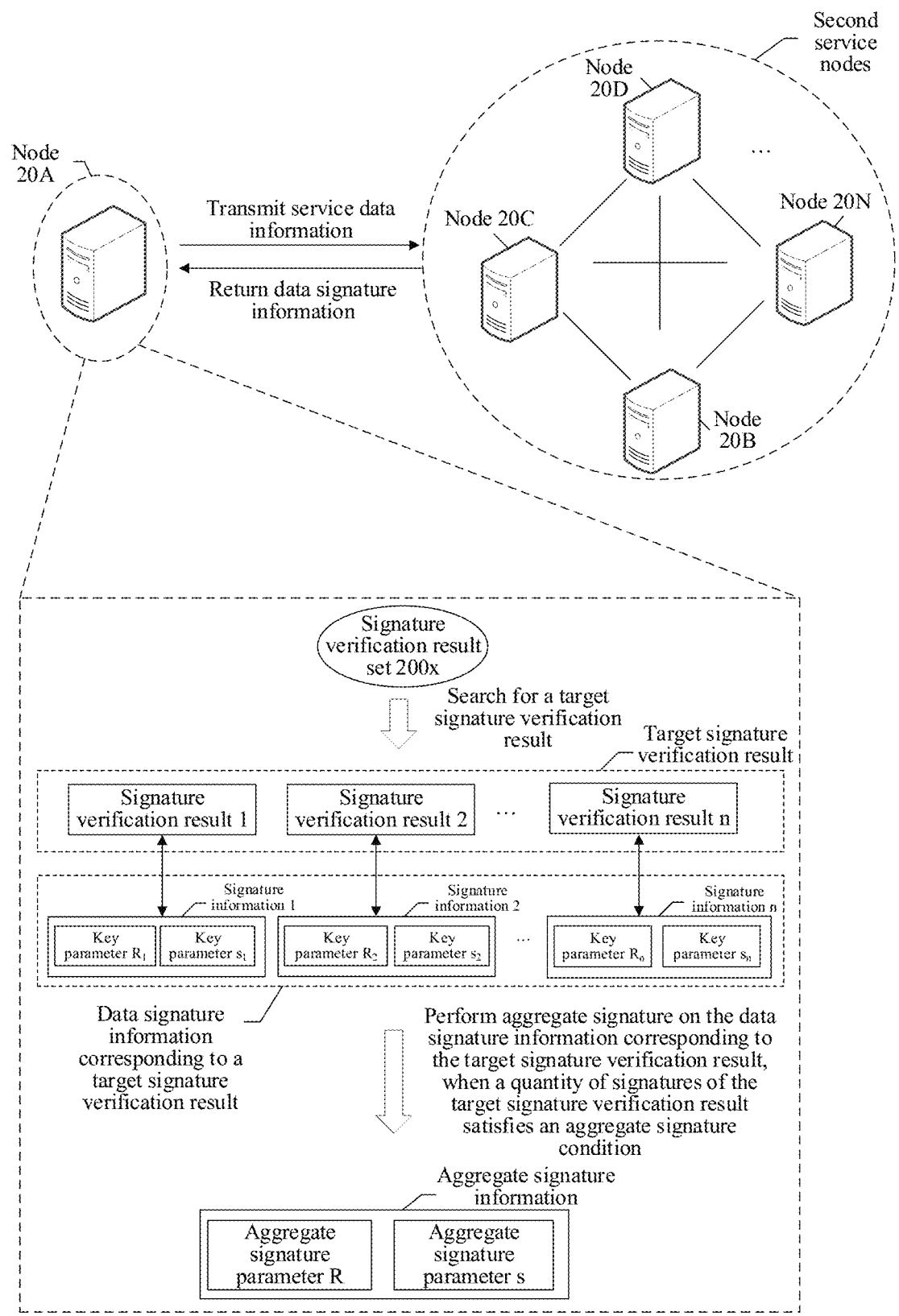
FIG. 2 is a schematic diagram of a scenario of performing data interaction according to an embodiment of the present disclosure.

For ease of understanding, further, FIG. 2 is a schematic diagram of a scenario of performing data interaction according to an embodiment of the present disclosure. As shown in FIG. 2, a node 20A may be a first service node in a blockchain network, that is, an aggregator participating in aggregate signature. For example, the node 20A may be the node 10A in the blockchain node system shown in FIG. 1. A node 20B, a node 20C, a node 20D, . . . , and a node 20N may be second service nodes in the blockchain network. For example, the second service nodes may be nodes other than the node 10A in the blockchain node system shown in FIG. 1.

The node 20A may obtain service data information to be transmitted to the second service node, to cause the second service node to perform signature processing on the service data information to obtain data signature information. The service data information herein may be directly transmitted by a user terminal on which a client runs, or may be forwarded by other nodes in the blockchain network, which is not limited herein. The service data information may be an asset transfer message initiated by a user of the user terminal through the client, and the asset transfer message may be used for requesting a transfer of virtual assets such as bitcoins, ethers, game gold coins, game diamonds and electronic notes.

The data signature information generated by the second service node may include a first key parameter and a second key parameter. The first key parameter and the second key parameter are both related to a random parameter generated by the second service node. The random parameter is determined by the second service node based on both a node private key of the second service node and the service data information received by the second service node.

For example, after receiving service data information broadcast by the node 20A, the node 20B shown in FIG. 2 may generate, based on a node private key of the node 20B and the service data information, a random parameter (for example, a parameter $r_1$) used for performing signature processing on the service data information. Further, the node 20B may generate a first key parameter (for example, a key parameter $R_i$) based on the random parameter and a fixed parameter (for example, a parameter G) associated with a non-interactive aggregate signature rule. In addition, the node 20B may further generate a second key parameter (for example, a key parameter $s_1$) based on the random parameter, the service data information, and the node private key of the node 20B. In this case, the node 20B may determine, based on the first key parameter and the second key parameter, data signature information (for example, signature information 1, that is $<R_i, s_1>$) used for being fed back to the node 20A.

Further, after the node 20A receives the data signature information returned by the second service node, the node 20A may perform signature verification on the received data signature information based on the first key parameter and the second key parameter in the data signature information, to obtain a signature verification result, and add the signature verification result to a verification result set (for example, a verification result set 200x shown in FIG. 2) associated with the blockchain network.

The node 20A may search for a signature verification result that satisfies a valid signature verification condition from the verification result set 200x, and determine the signature verification result that satisfies the valid signature verification condition as a target signature verification result. The valid verification condition may be a signature verification success. For example, the node 20A may determine a first auxiliary parameter and a second auxiliary parameter based on the received data signature information and the non-interactive aggregate signature rule, so as to determine whether the first auxiliary parameter is consistent with the second auxiliary parameter. As shown in FIG. 2, the target signature verification result found from the verification result set 200x by the node 20A may include a signature verification result 1, a signature verification result 2, . . . , and a signature verification result n. The signature verification result 1 may be a signature verification result obtained after the node 20A performs signature verification on data signature information 1 returned by the node 20B.

Therefore, the node 20A may calculate a quantity of signatures of the target signature verification result. When the quantity of signatures of the target signature verification result reaches a required quantity threshold (for example, n) of the aggregate signature condition, the node 20A may determine the quantity of signatures of the target signature verification result satisfies the aggregate signature condition. In this case, the node 20A may perform aggregate signature on data signature information corresponding to the n target signature verification results to obtain aggregate signature information. n is a positive integer, and may be dynamically adjusted according to an actual requirement, which is not limited herein.

As shown in FIG. 2, data signature information corresponding to the target signature verification result found by the node 20A may include signature information 1 (for example, $<R_i, s_1>$) corresponding to the signature verification result 1, signature information 2 (for example, $<R_2, s_2>$) corresponding to the signature verification result 2, . . . , and signature information n (for example, $<R_n, S_n>$) corresponding to the signature verification result n. When the quantity of signatures of the target signature verification result satisfies the aggregate signature condition, the node 20A may perform aggregate signature on the n data signature information to obtain the aggregate signature information (for example, $<R, s>$) shown in FIG. 2. An aggregate key parameter R may be referred to as a first aggregate key parameter, and an aggregate key parameter s may be referred to as a second aggregate key parameter.

For example, in a multi-party collaboration scenario, a sum of virtual assets may be jointly owned by multiple parties. For example, in a certain game, a warehouse game gold coin obtained by a certain camp may be set to be jointly managed by n (for example, 5) users. The 5 users may include users having game identities such as a regiment commander, and a battalion commander in the camp. When the virtual assets need to be processed (for example, asset transfer), the 5 users having asset management permission are required to respectively perform signature processing on this sum of virtual assets to obtain data signature information corresponding to this sum of virtual assets. Further, the node 20A (for example, a node corresponding to the regiment commander) may collect the data signature information returned by the second service nodes. The second service nodes may be service nodes (for example, nodes corresponding to the battalion commander, the regiment commander, or the like) corresponding to the users having asset management permission for this sum of virtual assets. When data signature information corresponding to each of the 5 target signature verification results that satisfy the valid verification condition is collected by the node 20A, the node 20A may perform aggregate signature on the 5 data signature information.

Therefore, in a case of obtaining data signature information broadcast by the node 20A, the second service node in this embodiment of the present disclosure does not need to perceive an existence of another signer and may directly perform signature processing on the data signature information to obtain data signature information. Data signature information obtained by each of the second service nodes is uniformly returned to the node 20A, so that in a case of getting enough data signature information corresponding to the target signature verification results that satisfy the valid verification condition collected, the node 20A may perform aggregate signature on all collected data signature information. The method does not need to obtain interaction data of all signers when the signer performs signature processing on the service data information, thereby reducing data interaction between networks, reducing the network complexity of the aggregate signature (e.g., reducing network complexity of implementing Practical Byzantine Fault Tolerance algorithm) and improving the signature efficiency of the aggregate signature (e.g., increasing transactions per second).

For the specific implementation of the data processing method provided in this embodiment of the present disclosure, reference may be made to the following embodiments corresponding to FIG. 3 to FIG. 6.

Figure 3:
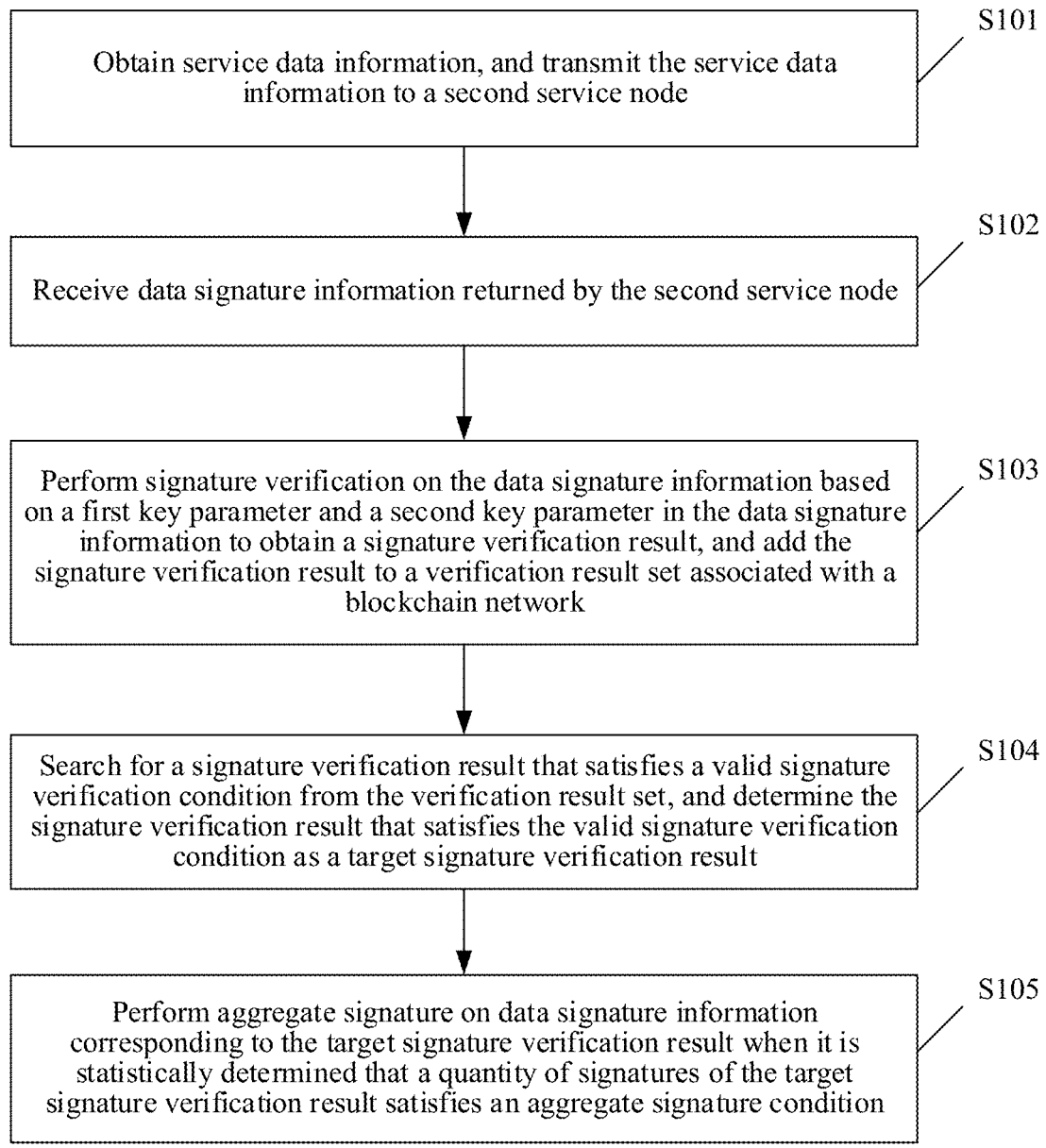
FIG. 3 is a schematic flowchart of a data processing method according to an embodiment of the present disclosure.

FIG. 3 is a schematic flowchart of a data processing method according to an embodiment of the present disclosure. As shown in FIG. 3, the method may be performed by a first service node (that is, an aggregator participating in aggregate signature) in a blockchain network. The first service node may be a user terminal accessing in the blockchain network, or may be a server accessing in the blockchain network, which is not limited herein. For ease of understanding, in this embodiment of the present disclosure, the first service node is taken as a server (for example, the node 10A in the blockchain node system shown in FIG. 1) as an example for description. The method may at least include the following step S101 to step S105:

S101: Obtain service data information, and transmit the service data information to a second service node.

Specifically, after receiving a service request transmitted by a user terminal, the first service node may obtain to-be-processed service data information (i.e., initial service data information to be processed) and user signature information carried in the service request. The user signature information may be obtained by the user terminal based on a user private key corresponding to the user terminal through performing signature processing on the to-be-processed service data information. Further, the first service node may obtain a user public key corresponding to the user private key, so as to perform signature verification on the user signature information based on the user public key, to obtain a user signature verification result. When the user signature verification result indicates a signature verification success, the first service node may use the to-be-processed service data information as service data information to be transmitted to a second service node in a blockchain network.

For example, when a user (for example, a user A) corresponding to the user terminal is required to execute a certain transaction service (for example, an asset transfer service) on a client, a trigger operation may be executed through the client. The trigger operation may include a contact operation such as clicking or long pressing, and may include a non-contact operation such as a voice or a gesture, which is not limited herein. Further, the user terminal may generate to-be-processed service data information associated with the client in response to the trigger operation. In this case, the user terminal may obtain a user private key of the user A, and perform signature processing on the to-be-processed service data information based on the user private key to obtain user signature information. Further, the user terminal may generate, based on the user signature information and the to-be-processed service data information, a service request to be transmitted to the first service node.

After receiving the service request transmitted by the user terminal, the first service node may obtain a user public key of the user A and perform signature verification on the user signature information in the service request to obtain a user signature verification result. When the user signature verification result indicates a signature verification failure, the first service node may determine the received service request as an invalid request. When the user signature verification result indicates a signature verification success, the first service node may determine the received service request as a valid request. In this case, the first service node may use the to-be-processed service data information in the service request as the service data information to be transmitted to the second service node in the blockchain network.

When the first service node broadcasts the service data information to the second service node in the blockchain network, to ensure the security of data transmission, the first service node may obtain a node public key of the second service node, so as to perform encryption processing on the service data information based on the node public key, to obtain encrypted data information. In this case, the first service node may transmit the encrypted data information to the second service node, to cause the second service node to perform decryption processing on the encrypted data information based on the node private key of the second service node itself, so as to obtain the data signature information.

Figure 4:
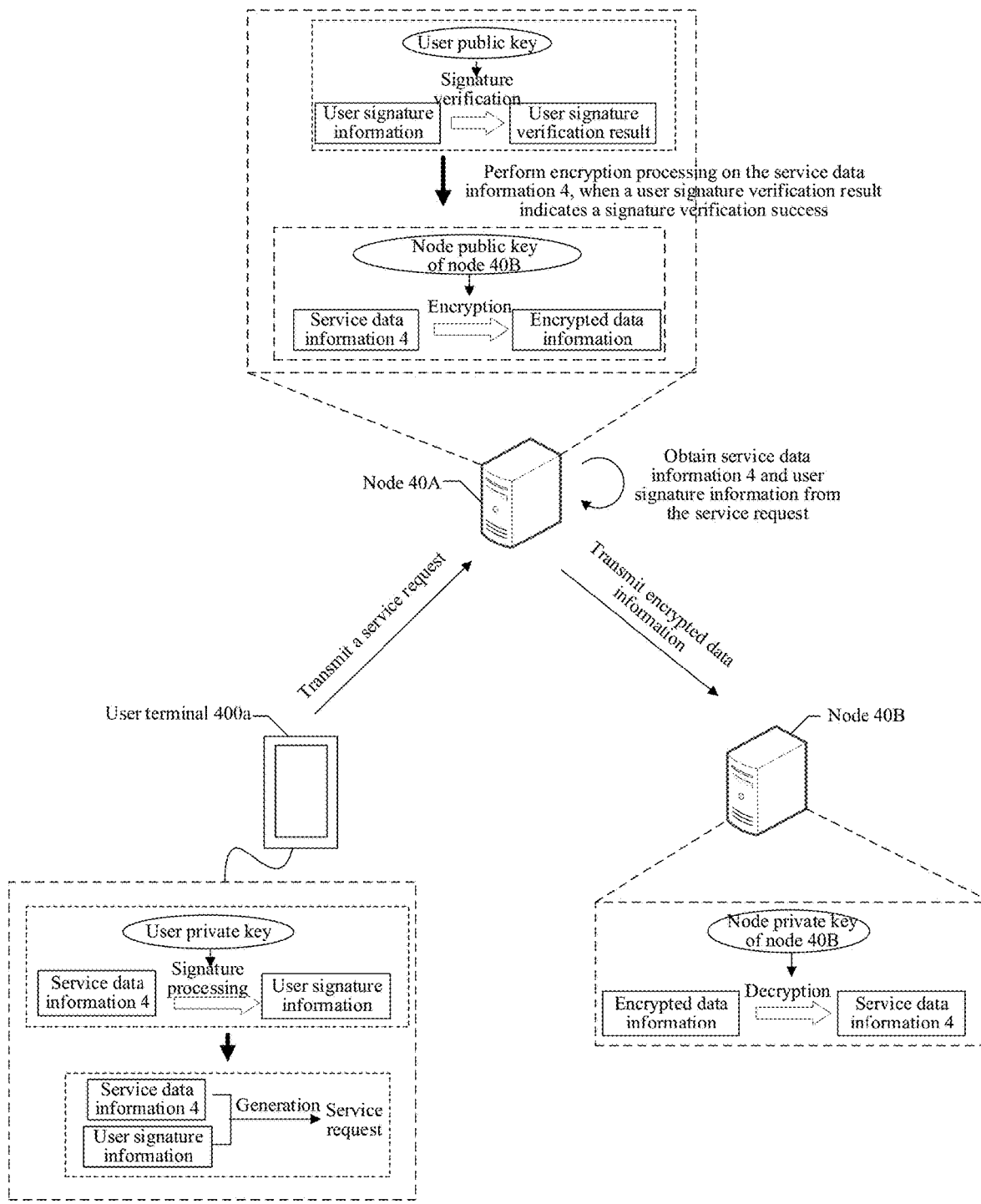
FIG. 4 is a schematic diagram of a scenario of broadcasting service data information to a second service node according to an embodiment of the present disclosure.

For ease of understanding, further, FIG. 4 is a schematic diagram of a scenario of broadcasting service data information to a second service node according to an embodiment of the present disclosure. As shown in FIG. 4, a node 40A may be a first service node in a blockchain network. For example, the node 40A may be the node 10A in the blockchain node system shown in FIG. 1. A node 40B may be a second service node in the blockchain network, and may be used for performing signature processing on service data information. The node 40B may be, for example, the node 10B, a blockchain node other than the node 10A in the blockchain node system shown in FIG. 1. A user terminal 400a may be a user terminal having a network connection relationship with the node 40A, and may be used for transmitting a service request carrying the service data information to the node 40A.

A user of the user terminal 400a may execute a trigger operation (for example, a click operation) through a client, to cause the user terminal 400a to generate, in response to the trigger operation, to-be-processed service data information (for example, service data information 4 shown in FIG. 4) used for being broadcast in the blockchain network. Further, the user terminal 400a may perform signature processing on the service data information 4 based on a user private key corresponding to the user terminal 400a, to obtain user signature information of the service data information 4. It is to be understood that the user terminal 400a may perform hash calculation on the service data information 4 to obtain abstract information h of the service data information 4. Further, the user terminal 400a may perform digital signature on the abstract information h based on the user private key corresponding to the user terminal 400a, to obtain the user signature information. In this case, the user terminal 400a may generate the service request shown in FIG. 4 based on the user signature information and the service data information 4, so as to transmit the service request to the node 40A shown in FIG. 4.

When receiving the service request, the node 40A may obtain the service data information 4 and the user signature information from the service request. Further, the node 40A may obtain a user public key corresponding to the user private key corresponding to the user terminal 400a, so as to perform signature verification on the user signature information based on the user public key, to obtain a user signature verification result. It is to be understood that the node 40A may perform signature verification on the digital signature in the user signature information based on the user public key to obtain the abstract information h of the service data information 4, and may utilize a hash algorithm that is the same with the user terminal 400a to perform hash calculation on the service data information 4 to obtain abstract information H of the service data information 4. Further, the node 40A may compare the abstract information h obtained through the signature verification with the abstract information H obtained through the hash calculation, to obtain the user signature verification result. If the user signature verification result indicates that the abstract information h is different from the abstract information H, a signature verification failure of the node 40A can be determined, that is, the service request is an invalid request. If the user signature verification result indicates that the abstract information h is the same as the abstract information H, a signature verification success of the node 40A can be determined, that is, the service request is a valid request.

When the user signature verification result indicates that the service request is the valid request, the node 40A may use the service data information 4 as service data information to be transmitted to the second service node in the blockchain network. During a process that the node 40A transmits the service data information 4 to the node 40B, to ensure the security of data transmission, the node 40A may obtain a node public key of the node 40B, so as to perform encryption processing on the service data information 4 based on the node public key of the node 40B to obtain encrypted data information. After the node 40B receives the encrypted data information transmitted by the node 40A, the node 40B may perform decryption processing on the encrypted data information based on the node private key of the node 40B itself, so as to obtain the service data information 4.

S102: Receive data signature information returned by the second service node.

Further, after the second service node obtains the data signature information transmitted by the first service node, the second service node may obtain a non-interactive aggregate signature rule indicated by an aggregate signature condition and perform signature processing on the data signature information, to obtain data signature information of the service data information.

In this embodiment of the present disclosure, the data signature information broadcast by the first service node to each of the second service nodes in the blockchain network is the same message. Therefore, the first service node may receive data signature information for the same message returned by a plurality of the second service nodes. The non-interactive aggregate signature rule may include a plurality of protocols. In this embodiment of the present disclosure, a Schnorr algorithm is taken as an example and a principle of digital signature is illustrated based on an elliptic curve.

The Schnorr algorithm is a type of public key electronic signature scheme, and is easy to be transformed into efficient aggregate signature due to its computational linearity feature. In a Schnorr algorithm process, E may be set as an elliptic curve defined in a finite field, points on E form a cyclic group, and order is a prime number n. $\mathbb{Z}/n\mathbb{Z}$ is marked as a ring of integers modulo n, and a value range of an element of $\mathbb{Z}/n\mathbb{Z}$ is $\{0, 1, 2, \ldots, n-1\}$; and $(\mathbb{Z}/n\mathbb{Z})^x$ is marked as a multiplicative group of integers modulo n, and a value range of an element of $(\mathbb{Z}/n\mathbb{Z})^x$ is $\{1, 2, \ldots, n-1\}$. In this embodiment of the present disclosure, a random parameter may be determined based on both a node private key of a signer (for example, the second service node) and the service data information. In some embodiments, the random parameter may further be obtained through a calculation and combination of another node private key (or a non-public value bound to the node private key) and the service data information. The non-public value herein refers to a mapping operation on the node private key. Certainly, the random parameter may have another generation method, which is not limited herein.

When performing signature processing on the service data information based on the non-interactive aggregate signature rule, in this embodiment of the present disclosure, the random parameter $k \in (\mathbb{Z}/n\mathbb{Z})^x$ may be selected as a node private key of a blockchain node in the blockchain network. For example, a node private key of a blockchain node (for example, a node i) in the blockchain network may be represented as $k_i$, where $k_i \in \{k_1, k_2, \ldots, k_N\}$. Based on the non-interactive aggregate signature rule, in this embodiment of the present disclosure, a product of the node private key of the blockchain node and a fixed parameter G may be used as a node public key of the node. The fixed parameter G herein may be related to the non-interactive aggregate signature rule, and the fixed parameter may refer to one fixed point on the elliptic curve E, and may be a generation element. For example, a node public key of the blockchain node (for example, the node i) in the blockchain network may be represented as $P_i$ (that is $P_i = k_i G$), where $P_i \in \{P_1, P_2, \ldots, P_N\}$.

Specifically, in this embodiment of the present disclosure, the non-interactive aggregate signature rule may be referred to the following formulas (1) to (9). In the non-interactive aggregate signature rule, the signer (that is the second service node, for example, the node i) may perform signature processing on the service data information to obtain data signature information. An example calculation formula of the data signature information $<R_i, s_i>$ may be referred to the following formulas (1) to (4):

$$r_i = \text{hash}(k_i, m) \in (\mathbb{Z}/n\mathbb{Z})^x, \quad (1)$$

where $r_1$ represents a random parameter generated by the node i, $k_i$ represents a node private key of the node i, m represents a to-be-signed message (for example, the service data information), prime number n may be an order, $(\mathbb{Z}/n\mathbb{Z})^x$ is a multiplicative group of integers modulo n, and a value range of an element of $(\mathbb{Z}/n\mathbb{Z})^x$ is $\{1, 2, \ldots, n-1\}$.

$$R_i = r_i G, \quad (2)$$

where $R_i$ represents a first key parameter determined by the node i, and G represents a fixed parameter associated with the non-interactive aggregate signature rule.

$$e = \text{hash}(m) \in \mathbb{Z}/n\mathbb{Z}, \quad (3)$$

where m represents the to-be-signed message, e represents a hash value (for example, a verification hash value corresponding to the service data information) corresponding to the to-be-signed message determined by the node i, $\mathbb{Z}/n\mathbb{Z}$ refers to a ring of integers modulo n, and a value range of an element of $\mathbb{Z}/n\mathbb{Z}$ is $\{0, 1, 2, \ldots, n-1\}$.

$$s_i = r_i + k_i e \in \mathbb{Z}/n\mathbb{Z}, \quad (4)$$

where $s_i$ represents a second key parameter determined by the node i, $r_i$ represents the random parameter generated by the node i, $k_i$ represents the node private key of the node i, and e represents the hash value corresponding to the to-be-signed message determined by the node i.

In the non-interactive aggregate signature rule, when an aggregator (that is the first service node, for example, a node p) statistically determines that a quantity of signatures n of a target signature verification result satisfies an aggregate signature condition, the aggregator may perform aggregate signature on data signature information (that is n data signature information) corresponding to the statistically determined target signature verification result to obtain aggregate signature information. An example calculation method through which the node p determines the aggregate signature information $<R, s>$ may be referred to the following formulas (5) to (6):

$$R = \sum_{i=1}^{n} R_i, \quad (5)$$

where $R_i$ represents a first key parameter in the data signature information returned by the node i, and R represents an aggregate key parameter (that is a first aggregate key parameter) obtained after the node p performs merging processing on the obtained n first key parameters.

$$s = \sum_{i=1}^{n} s_i, \quad (6)$$

where $s_i$ represents a second key parameter in the data signature information returned by the node i, and s represents an aggregate key parameter (that is a second aggregate key parameter) obtained after the node p performs merging processing on the obtained n second key parameters.

In the non-interactive aggregate signature rule, an example formula through which a signature verifier (that is the second service node) performs signature verification (that is verifying whether $S_1$ is equal to $S_2$) on the received aggregate signature information <R, s> may be referred to the following formulas (7) to (9):

$$E = \text{hash}(m) \in \mathbb{Z}/n\mathbb{Z}, \quad (7)$$

where m represents the to-be-signed message, and E represents a hash value (for example, a message hash value corresponding to the service data information) of the to-be-signed message determined by the signature verifier.

$$S_1 = sG, \quad (8)$$

where s represents the second aggregate key parameter, G represents the fixed parameter associated with the non-interactive aggregate signature rule, and $S_1$ represents an aggregate auxiliary parameter (that is a first aggregate auxiliary parameter) through which the signature verifier performs signature verification on the to-be-signed message.

$$S_2 = R + E \sum_{i=1}^{n} P_i, \quad (9)$$

where R represents the first aggregate key parameter, E represents the hash value of the to-be-signed message determined by the signature verifier, $P_i$ represents the node public key of the signer (for example, the node i), and $S_2$ represents the aggregate auxiliary parameter (that is a second aggregate auxiliary parameter) through which the signature verifier performs signature verification on the to-be-signed message.

After obtaining the service data information transmitted by the first service node in the blockchain network, the second service node (for example, the node i) may perform splicing processing on the node private key of the second service node itself and the service data information, to obtain integrated information. Further, the node i may obtain a hash determination rule in the non-interactive aggregate signature rule, so as to determine a integration has value corresponding to the integrated information based on the hash determination rule shown in the foregoing formula (1), and use the integration has value as a random parameter (for example, a parameter $r_1$) used for performing signature processing on the service data information.

Further, the node i may obtain a fixed parameter (for example, G) associated with the non-interactive aggregate signature rule, so as to use a first product of the random parameter and the fixed parameter as a first key parameter (for example, a key parameter $R_i$) according to the foregoing formula (2). In addition, the second service node may further determine a second product of a verification hash value corresponding to the service data information and the node private key, based on formula (3) and formula (4) in the non-interactive aggregate signature rule, so as to perform summation processing on the second product and the random parameter to obtain a second key parameter (for example, a key parameter $s_i$). In this case, the second service node may determine, based on the first key parameter and the second key parameter, data signature information <$R_i$, $s_i$> used for performing signature processing on the service data information.

In this embodiment of the present disclosure, the random parameter generated when the second service node performs signature processing on the service data information is determined based on both the node private key of the second service node and the service data information. In this way, not only the random parameter may be effectively ensured to be different when signature processing is performed on different to-be-signed messages, to protect the node private key, but also the data signature information obtained by the same node private key performing signature processing on the same to-be-signed message is ensured to be the same. For example, when a plurality of blockchain nodes (for example, nodes belonging to the same institution) in the blockchain network share one node private key, blocks are signed respectively and stored in a blockchain in the blockchain network, so as to effectively ensure consistency of blockchain data stored in each node. The random parameter used when signing the same message is the same, that is, the difference of the random parameters is always 0. Therefore, when each signer (that is the second service node) performs aggregate signature based on the non-interactive aggregate signature rule, it is determined that the verification hash value e corresponding to the service data information may directly perform hash calculation on the service data information without relying on the key parameter R, to obtain the key parameter R, so as to reduce complexity of verifying aggregate signature information.

S103: Perform signature verification on the data signature information based on the first key parameter and the second key parameter in the data signature information, to obtain a signature verification result, and add the signature verification result to a verification result set associated with the blockchain network.

Specifically, after receiving the data signature information returned by the second service node, the first service node may perform signature verification on the data signature information based on the first key parameter and the second key parameter in the data signature information, to obtain the signature verification result. The first service node may add the signature verification result to the valid result set in the verification result set, when the signature verification result is a signature verification success result. The first service node may add the signature verification result to the invalid result set in the verification result set, when the signature verification result is a signature verification failure result.

When the first service node receives the data signature information returned by the second service node, a first auxiliary parameter (for example, an auxiliary parameter $S_1$) may be obtained based on the foregoing formula (8) according to the second key parameter in the data signature information and the fixed parameter. Further, the first service node may obtain a message hash value (for example, a hash value E) corresponding to the service data information based on the formula (9) in the foregoing non-interactive aggregate signature rule, and obtain a second auxiliary parameter (for example, an auxiliary parameter $S_2$) after obtaining the node public key of the second service node, based on the node public key, the first key parameter and the message hash value. In this case, the first service node may determine the signature verification result based on the first auxiliary parameter and the second auxiliary parameter. An example verification process may be referred to the following formula (10):

$$G = \left(\sum_{i=1}^{n} s_i\right) G = \qquad (10)$$

$$\sum_{i=1}^{n} s_i G = \sum_{i=1}^{n} (r_i + k_i e) G = \sum_{i=1}^{n} r_i G + \sum_{i=1}^{n} k_i e G = R + e \sum_{i=1}^{n} P_i,$$

where the first service node may compare the first auxiliary parameter and the second auxiliary parameter to obtain a comparison result. When the comparison result indicates that the first auxiliary parameter is consistent with the second auxiliary parameter, the first service node may obtain the signature verification success result corresponding to the data signature information, that is, the signature verification of the first service node succeeds. When the comparison result indicates that the first auxiliary parameter is inconsistent with the second auxiliary parameter, the first service node may obtain the signature verification failure result corresponding to the data signature information, that is, the signature verification of the first service node fails. The first service node may determine the signature verification success result or the signature verification failure result as the signature verification result.

Figure 5:
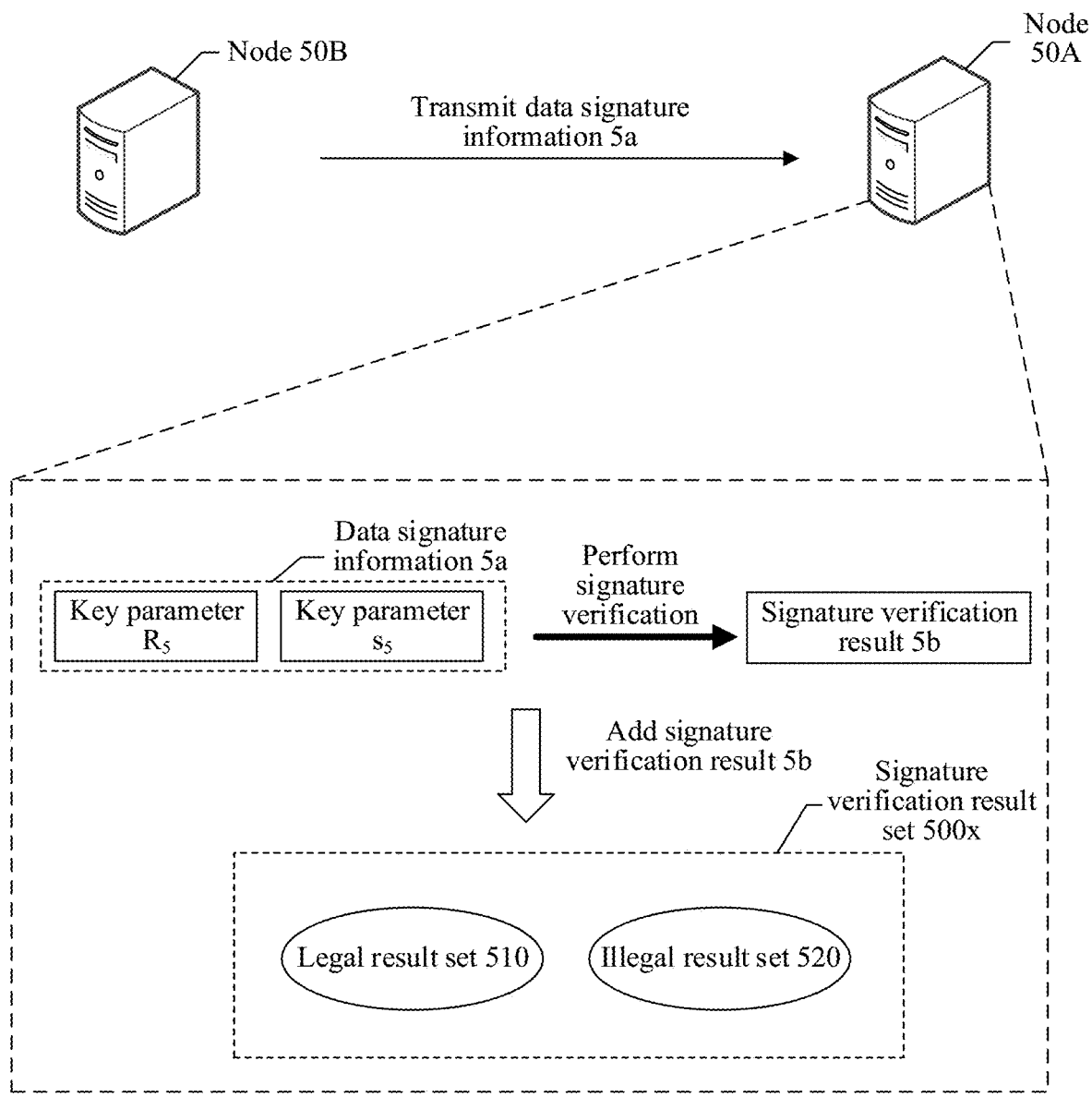
FIG. 5 is a schematic diagram of a scenario of performing signature verification on data signature information according to an embodiment of the present disclosure.

For ease of understanding, further, FIG. 5 is a schematic diagram of a scenario of performing signature verification on data signature information according to an embodiment of the present disclosure. As shown in FIG. 5, a node 50A in this embodiment of the present disclosure may be a first service node used for obtaining service data information to be broadcast to a blockchain network. For example, the node 50A may be the node 10A in the blockchain network shown in FIG. 1. A node 50B in this embodiment of the present disclosure may be a second service node in the blockchain network, that is a signer used for performing signature processing on service data information. The node 50B may be a blockchain node other than the first service node in the blockchain network, for example, the node 10B in the blockchain node system shown in FIG. 1.

As shown in FIG. 5, after receiving the service data information broadcast by the node 50A, the node 50B in this embodiment of the present disclosure may perform signature processing on the service data information to obtain data signature information (for example, data signature information 5a shown in FIG. 5) of the service data information. The data signature information 5a may include a first key parameter (for example, a key parameter $R_5$ shown in FIG. 5) and a second key parameter (for example, a key parameter 55 shown in FIG. 5). The key parameter $R_5$ is determined by the node 50B based on a random parameter and a fixed parameter (for example, G) associated with a non-interactive aggregate signature rule, and the key parameter 55 is determined by the node 50B based on the random parameter, a node private key of the node 50B and a verification hash value (for example, a hash value e) corresponding to the service data information, where the verification hash value is determined by the node 50B based on the service data information and the non-interactive aggregate signature rule.

The node 50B transmits the data signature information 5a to the node 50A, to cause the node 50A to obtain, based on the foregoing formula (8), according to the key parameter $s_5$ in the data signature information 5a and the fixed parameter, obtain a first auxiliary parameter (for example, an auxiliary parameter $S_1$) used for performing signature verification on the data signature information 5a. The node 50A may further determine a message hash value (for example, a hash value E) corresponding to the service data information based on the foregoing formula (9) in the non-interactive aggregate signature rule, and obtain, after obtaining a node public key (for example, $P_5$) of the node 50B, based on the node public key $P_5$, the key parameter $R_5$ and the message hash value, a second auxiliary parameter (for example, an auxiliary parameter $S_2$) used for performing signature verification on the data signature information 5a. In this case, the node 50A may determine a signature verification result (for example, a signature verification result 5b shown in FIG. 5) corresponding to the data signature information 5a based on the auxiliary parameter $S_1$ and the auxiliary parameter $S_2$.

The node 50A may compare the auxiliary parameter $S_1$ and the auxiliary parameter $S_2$ to obtain a comparison result. When the comparison result indicates that the auxiliary parameter $S_1$ is consistent with the auxiliary parameter $S_2$, the node 50A may determine a signature verification success, that is, the signature verification result 5b corresponding to the data signature information 5a is a signature verification success result. In this case, the node 50A may add the signature verification result 5b to a valid result set (for example, a valid result set 510) in a verification result set 500x shown in FIG. 5. When the comparison result indicates that the auxiliary parameter $S_1$ is inconsistent with the auxiliary parameter $S_2$, the node 50A may determine a signature verification failure, that is, the signature verification result 5b corresponding to the data signature information 5a is a signature verification failure. In this case, the node 50A may add the signature verification result 5b to an invalid result set (for example, an invalid result set 520 shown in FIG. 5) in the verification result set 500x.

S104: Search for a signature verification result that satisfies a valid signature verification condition from the verification result set, and determine the signature verification result that satisfies the valid signature verification condition as a target signature verification result.

Specifically, the first service node may search for a signature verification result that satisfies a valid signature verification condition from the verification result set, so as to determine the found signature verification result that satisfies the valid signature verification condition as a target signature verification result. The signature verification result that satisfies the valid verification condition may be a signature verification result belonging to the signature verification success result, that is, if the first auxiliary parameter and the second auxiliary parameter, determined by the first service node based on the received data signature information and the non-interactive aggregate signature rule, are consistent, the signature verification result of the data signature information is the signature verification result that satisfies the valid verification condition.

When the verification result set associated with the blockchain network includes the valid result set and the invalid result set, in this embodiment of the present disclosure, the signature verification result in the valid result set may be directly determined as the target signature verification result. As shown in FIG. 5, the target signature verification result determined by the node 50A (that is, the first service node) may be the signature verification result in the valid result set 510.

S105: Perform aggregate signature on data signature information corresponding to the target signature verification result when a quantity of signatures of the target signature verification result satisfies an aggregate signature condition.

A quantity of second service nodes in the blockchain network is N, where N being a positive integer; one signature verification result in the verification result set is determined by performing signature verification on one piece of data signature information returned by one second service node; and one piece of data signature information may include a first key parameter and a second key parameter. The first service node may obtain a quantity threshold in the aggregate signature condition, and calculate the quantity of signatures of the target signature verification result in the verification result set. When the quantity of signatures reaches the quantity threshold, the first service node may determine that the quantity of signatures satisfies the aggregate signature condition. The quantity of signatures may be n, n being a positive integer less than or equal to N. In this case, the first service node may obtain the first key parameter and the second key parameter in each piece of data signature information from n pieces of data signature information corresponding to n target signature verification results. Further, the first service node may perform merging processing on n first key parameters and use the merged n first key parameters as a first aggregate key parameter, and perform merging processing on n second key parameters and use the merged n second key parameters as a second aggregate key parameter. In this case, the first service node may perform aggregate signature on the first aggregate key parameter and the second aggregate key parameter based on a non-interactive aggregate signature rule indicated by the aggregate signature condition.

As shown in FIG. 2, the node 20A (that is the first service node) may obtain the quantity threshold in the aggregate signature condition. When the quantity of signatures of the target signature verification result calculated by the node 20A reaches the quantity threshold (for example, 4), the node 20A may determine the quantity of signatures satisfies the aggregate signature condition. In this case, the node 20A may perform aggregate signature on the data signature information corresponding to the calculated target signature verification result to obtain aggregate signature information corresponding to the data signature information.

Assuming that 4 target signature verification results calculated by the node 20A and satisfying the aggregate signature condition include a signature verification result 1, a signature verification result 2, a signature verification result 3, and a signature verification result 4. Data signature information corresponding to the signature verification result 1 is signature information 1 <R1, s1>, data signature information corresponding to the signature verification result 2 is signature information 2<R2, s2>, data signature information corresponding to the signature verification result 3 is signature information 3<R3, s3> and data signature information corresponding to the signature verification result 4 is signature information 4<R4, s4>.

From the 4 pieces of data signature information corresponding to the 4 target signature verification results, the node 20A may respectively obtain the first key parameters (such as, a key parameter R1, a key parameter R2, a key parameter R3, and a key parameter R4) in each piece of data signature information and the second key parameters (such as, a key parameter s1, a key parameter s2, a key parameter s3, and a key parameter s4) in each piece of data signature information. Further, the node 20A may perform merging processing on the 4 first key parameters and use a result of the merging processing as a first aggregate key parameter (for example, an aggregate key parameter R), and perform merging processing on the 4 second key parameters and use a result of the merging processing as a second aggregate key parameter (for example, an aggregate key parameter s). In this case, the first service node may perform aggregate signature on the aggregate key parameter R and the aggregate key parameter s based on a non-interactive aggregate signature rule indicated by the aggregate signature condition, to obtain aggregate signature information <R, s>.

In this embodiment of the present disclosure, after receiving the service data information transmitted by the first service node, the second service node in the blockchain network does not need to perceive an existence of another signer, and may directly perform signature processing on the received service data information to obtain the data signature information to be returned to the first service node. The data signature information determined by the second service node may include the first key parameter and the second key parameter. Since the two key parameters are both related to the random parameter generated by the second service node, there is no need to determine the first key parameter based on interaction data returned by all signers, thereby reducing network interaction. The random parameter is determined based on both the node private key of the second service node and the service data information. The first service node in the blockchain network can obtain data signature information obtained by a plurality of second service nodes through performing signature processing on the same service data information, so as to perform signature verification on each obtained piece of signature information to obtain the signature verification result of each piece of data signature information, and add the obtained signature verification result to the verification result set associated with the blockchain network. The first service node may search for the target signature verification result that satisfies the valid verification condition from the verification result set, and calculate the quantity of signatures of the target signature verification result. When the quantity of signatures satisfies the aggregate signature condition, the first service node may directly perform aggregate signature on the data signature information corresponding to the target signature verification result. During an entire aggregate signature process, since a signer does not need to perceive an existence of another signer, the signer can directly perform signature processing on the received service data information, so as to reduce network interaction in a signature process of the signer, thereby reducing network complexity of aggregate signature and improving signature efficiency of aggregate signature.

Figure 6:
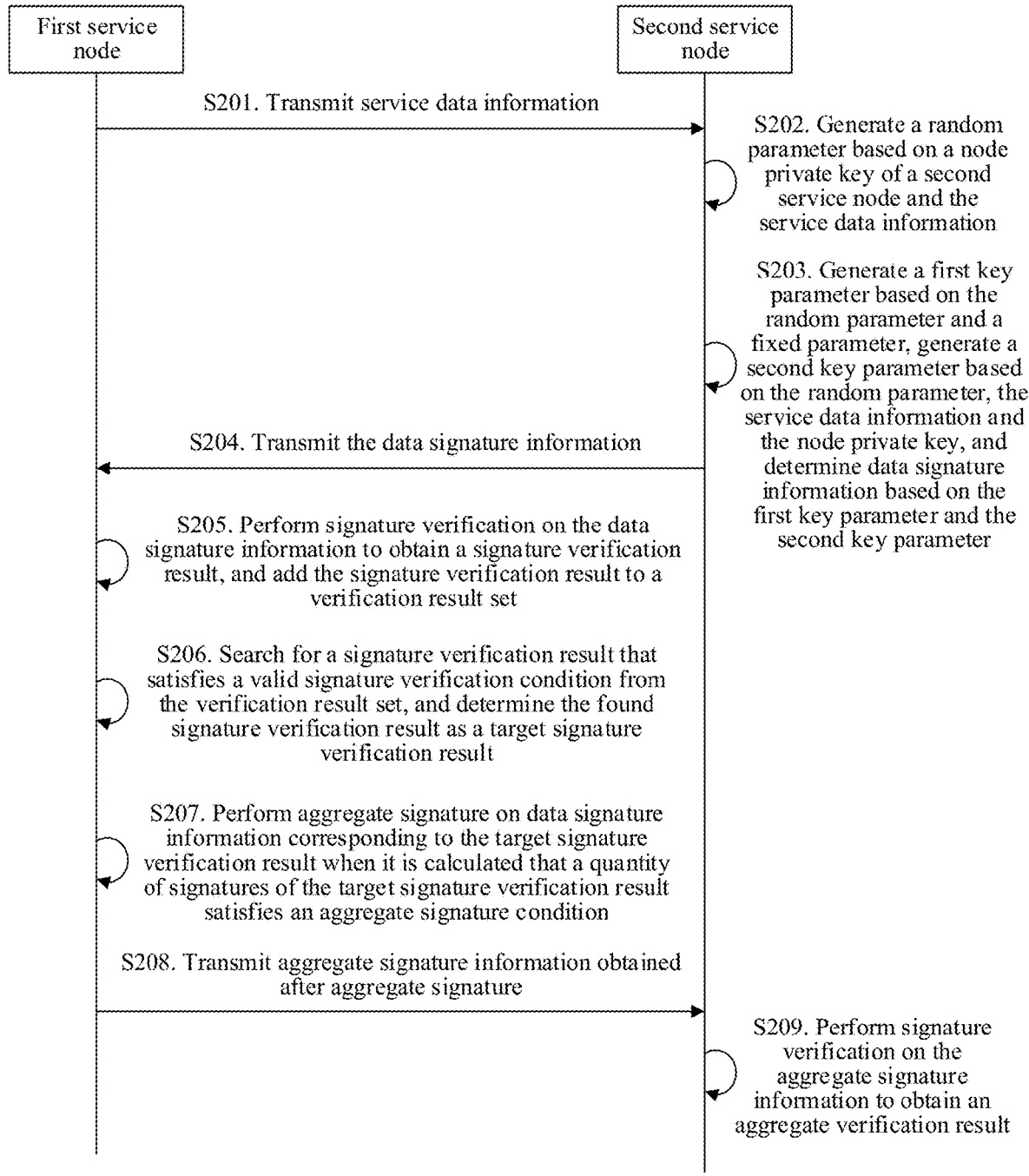
FIG. 6 is a schematic flowchart of a data processing method according to an embodiment of the present disclosure.

Further, FIG. 6 is a schematic flowchart of a data processing method according to an embodiment of the present disclosure. As shown in FIG. 6, the method may be jointly performed by a first service node and a second service node in a blockchain network. The first service node may be an aggregator participating in aggregate signature. For example, the first service node may be the node 10A in the blockchain network shown in FIG. 1. The second service node may be a signer participating in aggregate signature, and the second service node may be a blockchain node other than the first service node in the blockchain network. For example, the second service node may be the node 10B in the blockchain network shown in FIG. 1. The method at least includes the following steps S201 to S209.

S201: The first service node transmits obtained service data information to the second service node.

S202: After receiving the service data information transmitted by the first service node, based on a node private key of the second service node and the service data information, the second service node generates a random parameter used for performing signature processing on the service data information.

S203: The second service node generates a first key parameter based on the random parameter and a fixed parameter, generates a second key parameter based on the random parameter, the service data information, and the node private key, and determines data signature information based on the first key parameter and the second key parameter.

S204: The second service node transmits the data signature information to the first service node.

S205: After receiving the data signature information returned by the second service node, the first service node performs signature verification on the data signature information based on the first key parameter and the second key parameter in the data signature information, to obtain a signature verification result, and adds the signature verification result to a verification result set associated with the blockchain network.

S206: The first service node searches for a signature verification result that satisfies a valid signature verification condition from the verification result set, and determines the signature verification result that satisfies the valid signature verification condition as a target signature verification result.

S207: The first service node performs aggregate signature on the data signature information corresponding to the target signature verification result when a quantity of signatures of the target signature verification result satisfies an aggregate signature condition.

For the specific implementation of step S201 to step S207, reference may be made to the description about step S101 to step S105 in the embodiment corresponding to FIG. 3, and details are not described herein again.

S208: The first service node transmits the aggregate signature information obtained after the aggregate signature to the second service node.

The aggregate signature information may be obtained by the first service node through performing aggregate signature on the data signature information corresponding to a target signature verification result. The target signature verification result herein may be a signature verification result that satisfies a valid verification condition and is found in the verification result set by the first service node. One signature verification result is determined by the first service node through performing signature verification on one piece of data signature information returned by one second service node. The aggregate signature information may include a first aggregate key parameter (for example, the aggregate key parameter R shown in FIG. 2) and a second aggregate key parameter (for example, the aggregate key parameter s shown in FIG. 2).

S209: During receiving the aggregate signature information, the second service node performs signature verification on the aggregate signature information to obtain an aggregate verification result.

Specifically, after obtaining the aggregate signature information transmitted by the first service node, the second service node may obtain a node public key of the second service node associated with the target signature verification result, and perform merging processing on the obtained node public key to obtain a target public key. Further, the second service node may obtain a first aggregate auxiliary parameter based on the second aggregate key parameter and a fixed parameter associated with a non-interactive aggregate signature rule. In addition, the second service node may obtain, based on the non-interactive aggregate signature rule, a data hash value corresponding to the service data information, so as to obtain a second aggregate auxiliary parameter based on the target public key, the data hash value and the first aggregate key parameter. The second service node may determine an aggregate signature verification result corresponding to the aggregate signature information as a valid result when the first aggregate auxiliary parameter is consistent with the second aggregate auxiliary parameter. In some embodiments, the second service node may determine an aggregate signature verification result corresponding to the aggregate signature information as an invalid result when the first aggregate auxiliary parameter is inconsistent with the second aggregate auxiliary parameter.

As shown in FIG. 2, the aggregate signature information generated by the node 20A (that is the first service node) is determined by the node 20A based on the data signature information corresponding to the target signature verification result after calculation when it is calculated that a quantity of signatures of the target signature verification result satisfies an aggregate signature condition. For example, assuming that the data signature information corresponding to the target signature verification result after calculation by the node 20A may include signature information 1 returned by the node 20B, signature information 2 returned by the node 20C, signature information 3 returned by the node 20D, and signature information 4 returned by the node 20E, the node 20A may determine the aggregate signature information according to the signature information 1, the signature information 2, the signature information 3 and the signature information 4.

When the second service node (for example, the node 20B) in the blockchain network obtains the aggregate signature information broadcast by the node 20A, the node 20B may obtain a node public key (for example, $P_1$) of the node 20B, a node public key (for example, $P_2$) of the node 20C, a node public key (for example, $P_3$) of the node 20D, and a node public key (for example, $P_4$) of the node 20E, so as to perform merging processing on the obtained 4 public keys to obtain a target public key (that is an aggregate public key).

Further, the node 20B may obtain a first aggregate auxiliary parameter (for example, an aggregate auxiliary parameter $S_1$) used for performing signature verification on the aggregate signature information, according to the formula (8) in the non-interactive aggregate signature rule, the second aggregate key parameter (for example, an aggregate key parameter s) and a fixed parameter associated with the non-interactive aggregate signature rule (for example, G). In addition, the node 20B may obtain a data hash value (for example, a hash value E) corresponding to the service data information based on formula (7) and formula (9) in the non-interactive aggregate signature rule, so as to obtain a second aggregate auxiliary parameter (for example, an aggregate auxiliary parameter $S_2$) used for performing signature verification on the aggregate signature information based on the target public key, the data hash value and the first aggregate key parameter. The second service node may determine an aggregate signature verification result corresponding to the aggregate signature information as a valid result when the first aggregate auxiliary parameter is consistent with the second aggregate auxiliary parameter. The second service node may determine an aggregate signature verification result corresponding to the aggregate signature information as an invalid result when the first aggregate auxiliary parameter is inconsistent with the second aggregate auxiliary parameter.

In a scenario of performing aggregate signature on a block transaction, the service data information received by the second service node may be a to-be-verified block including a plurality of transaction request messages. In this case, each signer may perform signature processing on different transaction request messages in the to-be-verified block to obtain data signature information corresponding to each transaction request message. During performing signature verification on the aggregate signature information, the second service node may determine a second aggregate auxiliary parameter corresponding to the aggregate signature information. For a calculation formula of the second aggregate auxiliary parameter, reference may be made to formula (11).

$$\sum_{j=1}^{m} S_2^j = \sum_{j=1}^{m} R_j + \sum_{j=1}^{m} \sum_{i=1}^{n} E_j P_i \quad (11)$$

where m refers to a quantity of messages of a to-be-signed message, and n refers to a quantity of signers participating in the aggregate signature. $S_2^j$ refers to an aggregate auxiliary parameter performing signature verification on the to-be-signed message (for example, a transaction request message j), $E_j$ represents a hash value of the to-be-signed message (for example, the transaction request message j) determined by a signature verifier, and $P_i$ represents a node public key of a signer (for example, a node i).

There are different to-be-signed messages included in the to-be-verified block. As a result, verification hash values (that is the hash value e) corresponding to the to-be-signed messages determined according to the formula (3) in the non-interactive aggregate signature rule are different. Correspondingly, when performing verification on the aggregate signature information, $\Sigma_{i=1}^{N} e_i P_i$ calculation in the formula (11) cannot be optimized, which does not affect aggregation of signatures. In blockchain, assuming that there are 1000 transaction request messages and each transaction request message has its own signature information, after packing the 1000 transaction request messages into a block, the blockchain node (for example, the first service node) having a packing function may merge these signature information into total signature information (that is the aggregate signature information). Since a consensus node in the blockchain network needs to pay attention to whether the signature information of all transaction request messages is correct when performing consensus on the packed block, although such verification efficiency is not much different from one-by-one verification efficiency, the quantity of signatures may be greatly reduced and a large amount of storage space and network traffic may be saved.

It is to be understood that the non-interactive aggregate signature scheme involved in the embodiment of the present disclosure, may effectively lower storage space, reduce network traffic, and shorten verification time, which has an obvious effect on a scenario with a relatively low signature frequency but a relatively high verification frequency. For example, in a multi-party collaboration (for example, the signer is fixed) scenario, the node public key of each of the signers may be simply merged into an aggregate public key (that is the target public key), which is represented as $P=\Sigma_{i=1}^{n} P_i$. For example, when a sum of virtual assets is owned by multiple parties, a person to which the virtual assets may belong may be an aggregate public key of the multiple parties. When processing (for example, performing asset transfer transaction) the virtual assets, the aggregator (that is the first service node) is required to perform aggregate signature on the data signature information of each of the signers (for example, the second service nodes). During a process of the whole aggregate signature, the signer does not need to perceive the existence of another signer and may directly perform signature by itself, and then one of the signers (for example, the first service node) collects data signature information and performs aggregate signature when an aggregate signature condition is satisfied. Calculation may be performed according to the aggregate signature information and the aggregate public key in verification. When the transaction is consensus in the blockchain network as service data information, the transaction is propagated in the blockchain network so that a plurality of blockchain nodes store the transaction. Therefore, the transaction may be verified at any time, that is, the verification frequency is relatively high. In this case, using the aggregated signature scheme can lower storage space, reduce network traffic, and shorten verification time, thereby improving the overall performance of the blockchain system.

Figure 7:
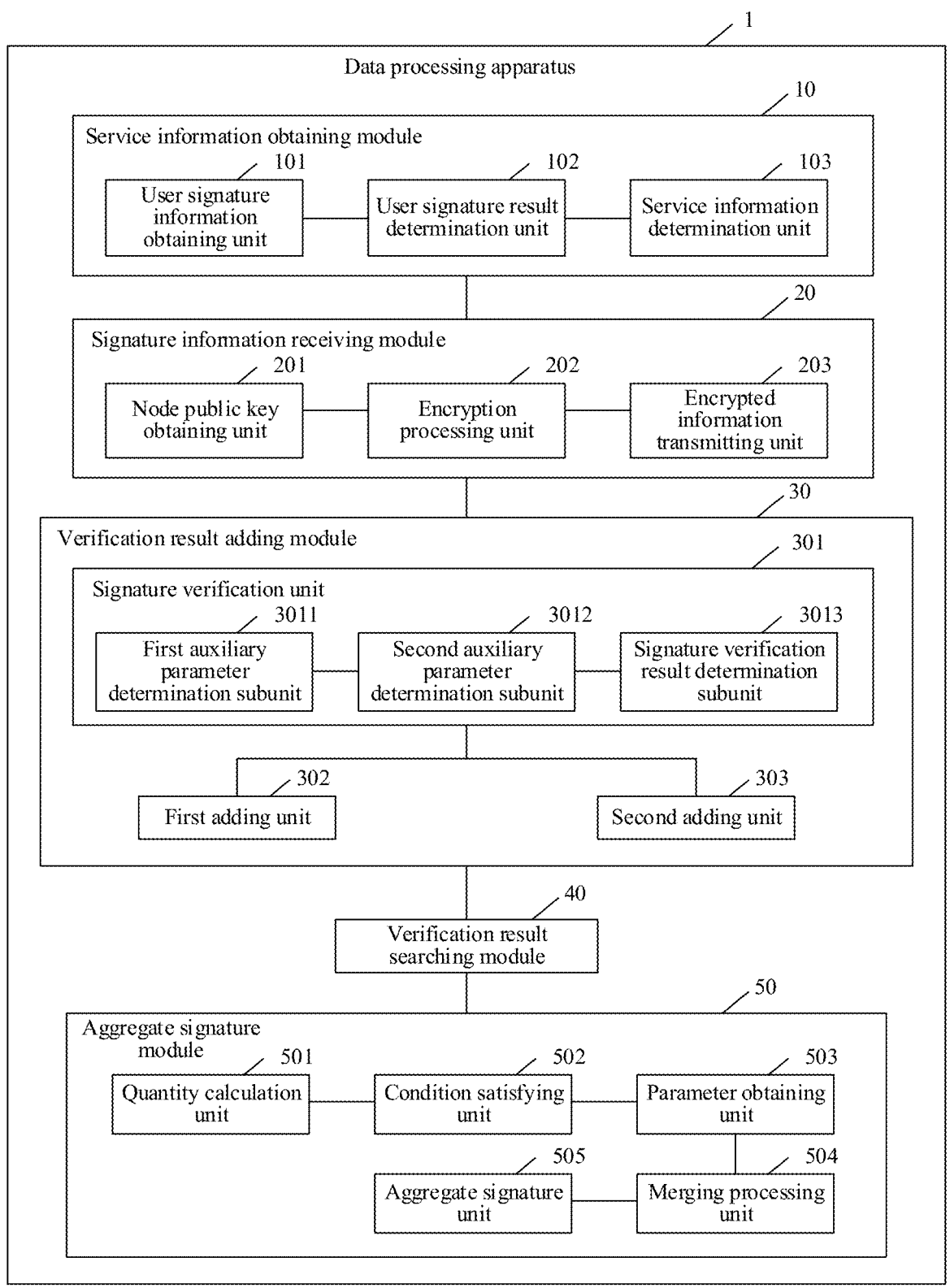
FIG. 7 is a schematic structural diagram of a data processing apparatus according to an embodiment of the present disclosure.

Further, FIG. 7 is a schematic structural diagram of a data processing apparatus according to an embodiment of the present disclosure. A data processing apparatus 1 may be a computer program (including program code) run on a computer device. For example, the data processing apparatus 1 is application software. The data processing apparatus 1 may be used for performing steps corresponding to the method provided in this embodiment of the present disclosure. As shown in FIG. 7, the data processing apparatus 1 may be a first service node run in a blockchain network. The first service node may be the node 20A in the embodiment shown in FIG. 2. The data processing apparatus 1 may include: a service information obtaining module 10, a signature information receiving module 20, a verification result adding module 30, a verification result searching module 40 and an aggregate signature module 50.

The service information obtaining module 10 is configured to obtain service data information and transmit the service data information to a second service node, the second service node being a node other than the first service node in the blockchain network, where the service information obtaining module 10 includes: a user signature information obtaining unit 101, a user signature verification result determination unit 102 and a service information determination unit 103.

The user signature information obtaining unit 101 is configured to obtain, after a service request transmitted by a user terminal is received, to-be-processed service data information and user signature information carried in the service request, the user signature information being obtained by a user private key corresponding to the user terminal through performing signature processing on the to-be-processed service data information;

the user signature verification result determination unit 102 is configured to obtain a user public key corresponding to the user private key, and perform signature verification on the user signature information based on the user public key, to obtain a user signature verification result; and the service information determination unit 103 is configured to use the to-be-processed service data information as the service data information when the user signature verification result indicates a signature verification success.

For the specific implementation of the user signature information obtaining unit 101, the user signature verification result determination unit 102 and the service information determination unit 103, reference may be made to the description about step S101 in the embodiment shown in FIG. 3, and details are not described herein again.

The signature information receiving module 20 is configured to receive data signature information returned by the second service node, the data signature information being obtained by the second service node through performing signature processing on the service data information; the data signature information including a first key parameter and a second key parameter; the first key parameter and the second key parameter both being related to a random parameter determined by the second service node; the random parameter being determined by the second service node based on both a node private key and the service data information.

The signature information receiving module 20 includes: a node public key obtaining unit 201, an encryption processing unit 202 and an encrypted information transmitting unit 203.

The node public key obtaining unit 201 is configured to obtain a node public key of the second service node;
the encryption processing unit 202 is configured to perform encryption processing on the service data information based on the node public key, to obtain encrypted data information; and
the encrypted information transmitting unit 203 is configured to transmit the encrypted data signature information to the second service node.

For the specific implementation of the node public key obtaining unit 201, the encryption processing unit 202, and the encrypted information transmitting unit 203, reference may be made to the description about step S102 in the embodiment shown in FIG. 3, and details are not described herein again. The verification result adding module 30 is configured to perform signature verification on the data signature information based on the first key parameter and the second key parameter to obtain a signature verification result, and add the signature verification result to a verification result set associated with the blockchain network.

The verification result set includes a valid result set and an invalid result set.

The verification result adding module 30 includes: a signature verification unit 301, a first adding unit 302, and a second adding unit 303.

The signature verification unit 301 is configured to perform signature verification on the data signature information based on the first key parameter and the second key parameter, to obtain the signature verification result,
where the first key parameter is determined by the second service node based on the random parameter and a fixed parameter associated with a non-interactive aggregate signature rule; the second key parameter is determined by the second service node based on the random parameter, the node private key and a verification hash value; and the verification hash value is determined by the second service node based on the service data information and the non-interactive aggregate signature rule.

The signature verification unit 301 includes: a first auxiliary parameter determination subunit 3011, a second auxiliary parameter determination subunit 3012, and a signature verification result determination subunit 3013.

The first auxiliary parameter determination subunit 3011 is configured to obtain a first auxiliary parameter based on the second key parameter and the fixed parameter;
the second auxiliary parameter determination subunit 3012 is configured to obtain, based on the non-interactive aggregate signature rule, a message hash value corresponding to the service data information, and obtain a second auxiliary parameter based on a node public key of the second service node, the first key parameter and the message hash value; and
the signature verification result determination subunit 3013 is configured to determine the signature verification result based on the first auxiliary parameter and the second auxiliary parameter.

The signature verification result determination subunit 3013 is specifically configured to:
compare the first auxiliary parameter and the second auxiliary parameter to obtain a comparison result;
obtain the signature verification success result corresponding to the data signature information when the comparison result indicates that the first auxiliary parameter is consistent with the second auxiliary parameter;
obtain the signature verification failure result corresponding to the data signature information when the comparison result indicates that the first auxiliary parameter is inconsistent with the second auxiliary parameter; and
determine the signature verification success result or the signature verification failure result as the signature verification result.

For the specific implementation of the first auxiliary parameter determination subunit 3011, the second auxiliary parameter determination subunit 3012, and the signature verification result determination subunit 3013, reference may be made to the description of the signature verification result in the embodiment shown in FIG. 3, and details are not described herein again.

The first adding unit 302 is configured to add the signature verification result to the valid result set in the verification result set, when the signature verification result is the signature verification success result; and
the second adding unit 303 is configured to add the signature verification result to the invalid result set in the verification result set, when the signature verification result is the signature verification failure result.

For the specific implementation of the signature verification unit 301, the first adding unit 302, and the second adding unit 303, reference may be made to the description about step S103 in the embodiment shown in FIG. 3, and details are not described herein again.

The verification result searching module 40 is configured to search for a signature verification result that satisfies a valid signature verification condition from the verification result set, and determine the signature verification result that satisfies the valid signature verification condition as a target signature verification result; and
the aggregate signature module 50 is configured to perform aggregate signature on the data signature information corresponding to the target signature verification result when a quantity of signatures of the target signature verification result satisfies an aggregate signature condition.

The quantity of second service nodes in the blockchain network is N, where N is a positive integer; one signature verification result in the verification result set is determined by performing signature verification on one piece of data signature information returned by one second service node; and one piece of data signature information includes: one first key parameter and one second key parameter.

The aggregate signature module 50 includes: a quantity calculation unit 501, a condition satisfying unit 502, a parameter obtaining unit 503, a merging processing unit 504, and an aggregate signature unit 505.

The quantity calculation unit 501 is configured to obtain a quantity threshold in the aggregate signature condition, and calculate the quantity of signatures of the target signature verification result in the verification result set.

The condition satisfying unit 502 is configured to determine that the quantity of signatures satisfies the aggregate signature condition when the quantity of signatures reaches the quantity threshold, where the quantity of signatures is n, and n is a positive integer less than or equal to N.

The parameter obtaining unit 503 is configured to obtain the first key parameter and the second key parameter of each piece of data signature information from n data signature information corresponding to n target signature verification results.

The merging processing unit 504 is configured to perform merging processing on n first key parameters and use the n merged first key parameters obtained as a first aggregate key parameter, and perform merging processing on n second key parameters and use the n merged second key parameters as a second aggregate key parameter.

The aggregate signature unit 505 is configured to perform aggregate signature on the first aggregate key parameter and the second aggregate key parameter based on a non-interactive aggregate signature rule indicated by the aggregate signature condition.

For the specific implementation of the calculation unit 501, the condition satisfying unit 502, the parameter obtaining unit 503, the merging processing unit 504, and the aggregate signature unit 505, reference may be made to the description about step S105 in the embodiment shown in FIG. 3, and details are not described herein again.

For the specific implementation of the service information obtaining module 10, the signature information receiving module 20, the verification result adding module 30, the verification result searching module 40 and the aggregate signature module 50, reference may be made to the description about step S101 to step S105 in the embodiment corresponding to FIG. 3, and details are not described herein again. In addition, the description of beneficial effects of the same method is not described herein again.

The term unit (and other similar terms such as subunit, module, submodule, etc.) in this disclosure may refer to a software unit, a hardware unit, or a combination thereof. A software unit (e.g., computer program) may be developed using a computer programming language. A hardware unit may be implemented using processing circuitry and/or memory. Each unit can be implemented using one or more processors (or processors and memory). Likewise, a processor (or processors and memory) can be used to implement one or more units. Moreover, each unit can be part of an overall unit that includes the functionalities of the unit.

Figure 8:
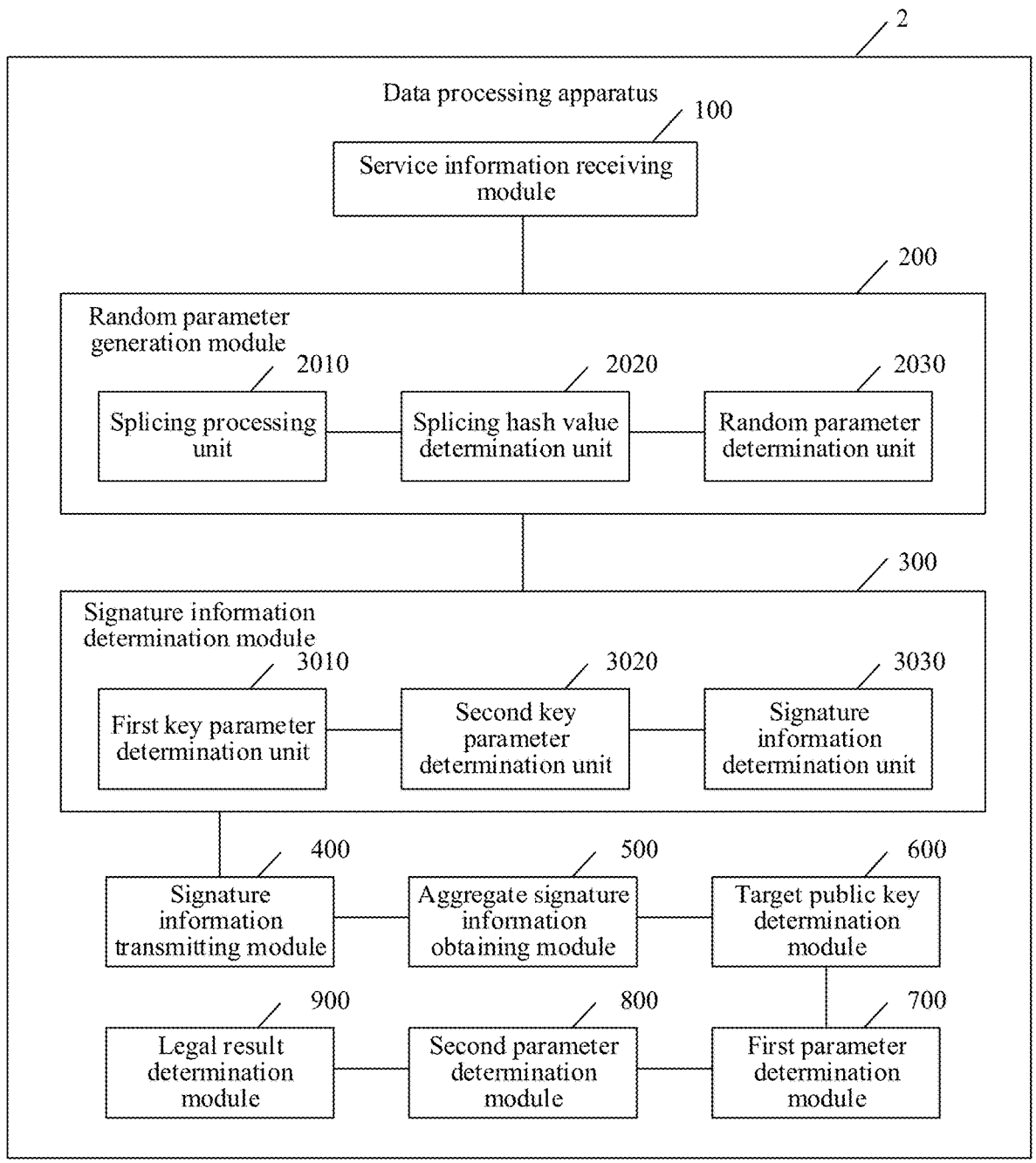
FIG. 8 is a schematic structural diagram of a data processing apparatus according to an embodiment of the present disclosure.

Further, FIG. 8 is a schematic structural diagram of a data processing apparatus according to an embodiment of the present disclosure. A data processing apparatus 2 may be a computer program (including program code) run on a computer device. For example, the data processing apparatus 2 is application software. The data processing apparatus 2 may be used for performing steps corresponding to the method provided in this embodiment of the present disclosure. As shown in FIG. 8, the data processing apparatus 2 may be a second service node run in a blockchain network. For example, the second service node may be the node 20B in the embodiment shown in FIG. 2. The data processing apparatus 2 may include: a service information receiving module 100, a random parameter generation module 200, a signature information determination module 300, a signature information transmission module 400, an aggregate signature information obtaining module 500, a target public key determination module 600, a first parameter determination module 700, a second parameter determination module 800 and a valid result determination module 900.

The service information receiving module 100 is configured to receive service data information transmitted by a first service node in a blockchain network.

The random parameter generation module 200 is configured to generate a random parameter used for performing signature processing on the service data information, based on a node private key of a second service node and the service data information.

The random parameter generation module 200 includes: a splicing processing unit 2010, a integration has value determination unit 2020, and a random parameter determination unit 2030.

The splicing processing unit 2010 is configured to perform splicing processing on the node private key of the second service node and the service data information, to obtain integrated information;

the integration has value determination unit 2020 is configured to obtain a hash determination rule in a non-interactive aggregate signature rule, and determine a integration has value corresponding to the integrated information based on the hash determination rule; and the random parameter determination unit 2030 is configured to use the integration has value as the random parameter.

For the specific implementation of the splicing processing unit 2010, the integration has value determination unit 2020, and the random parameter determination unit 2030, reference may be made to the description about step S202 in the embodiment shown in FIG. 6, and details are not described herein again.

The signature information determination module 300 is configured to generate a first key parameter based on the random parameter and a fixed parameter, generate a second key parameter based on the random parameter, the service data information, and the node private key, and determine data signature information based on the first key parameter and the second key parameter.

The signature information determination module 300 includes: a first key parameter determination unit 3010, a second key parameter determination unit 3020, and a signature information determination unit 3030.

The first key parameter determination unit 3010 is configured to obtain the fixed parameter associated with the non-interactive aggregate signature rule, and use a first product of the random parameter and the fixed parameter as the first key parameter;

the second key parameter determination unit 3020 is configured to determine, based on the non-interactive aggregate signature rule, a second product of a verification hash value corresponding to the service data information and the node private key, and perform summation processing on the second product and the random parameter to obtain the second key parameter; and the signature information determination unit 3030 is configured to determine the data signature information based on the first key parameter and the second key parameter.

For the specific implementation of the first key parameter determination unit 3010, the second key parameter determination 3020, and the signature information determination unit 3030, reference may be made to the description about step S203 in the embodiment shown in FIG. 6, and details are not described herein again.

The signature information transmission module 400 is configured to transmit the data signature information to the first service node.

The aggregate signature information obtaining module 500 is configured to receive aggregate signature information transmitted by the first service node, where the aggregate signature information is obtained by the first service node through performing aggregate signature on the data signature information corresponding to a target signature verification result; the target signature verification result is a signature verification result that satisfies a valid verification condition and is found from a verification result set by the first service node; the signature verification result is determined by the first service node through performing signature verification on the data signature information; and the aggregate signature information includes a first aggregate key parameter and a second aggregate key parameter.

The target public key determination module 600 is configured to obtain a node public key of the second service node associated with the target signature verification result, and perform merging processing on the obtained node public key to obtain a target public key.

The first parameter determination module 700 is configured to obtain a first aggregate auxiliary parameter based on the second aggregate key parameter and a fixed parameter associated with a non-interactive aggregate signature rule.

The second parameter determination module 800 is configured to obtain, based on the non-interactive aggregate signature rule, a data hash value corresponding to the service data information, and obtain a second aggregate auxiliary parameter based on the target public key, the data hash value and the first aggregate key parameter.

The valid result determination module 900 is configured to determine an aggregate signature verification result corresponding to the aggregate signature information as a valid result when the first aggregate auxiliary parameter is consistent with the second aggregate auxiliary parameter.

For the specific implementation on the service information receiving module 100, the random parameter generation module 200, the signature information determination module 300, the signature information transmission module 400, the aggregate signature information obtaining module 500, the target public key determination module 600, the first parameter determination module 700, the second parameter determination module 800, and the valid result determination module 900, reference may be made to the description about step S201 to step S209 in the embodiment shown in FIG. 6, and details are not described herein again. In addition, the description of beneficial effects of the same method is not described herein again.

Figure 9:
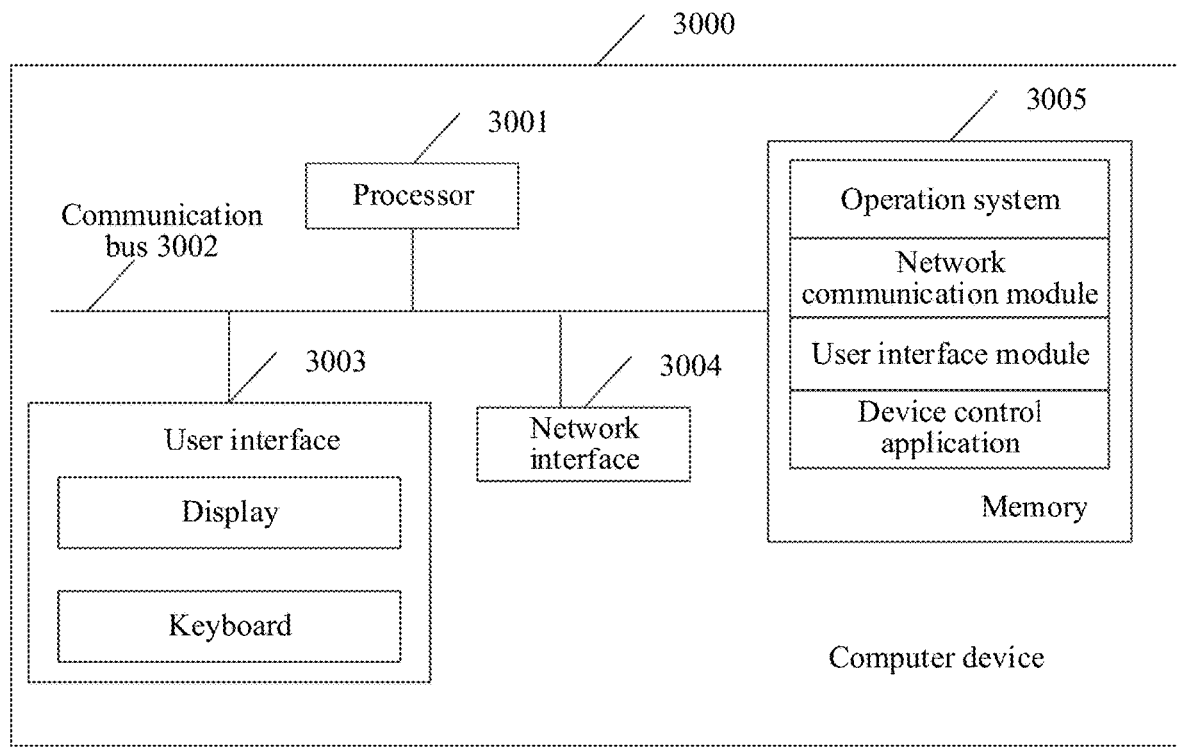
FIG. 9 is a schematic diagram of a computer device according to an embodiment of the present disclosure.

Further, FIG. 9 is a schematic diagram of a computer device according to an embodiment of the present disclosure. As shown in FIG. 9, the computer device 3000 may include: at least one processor 3001, for example, a CPU, at least one network interface 3004, a user interface 3003, a memory 3005, and at least one communications bus 3002. The communications bus 3002 is configured to implement connection and communication between the components. The user interface 3003 may include a display and a keyboard. In some embodiments, the network interface 3004 may include a standard wired interface and wireless interface (for example, a WI-FI interface). The memory 3005 may be a high-speed random access memory (RAM), or may be a non-volatile memory, for example, at least one magnetic disk memory. In some embodiments, the memory 3005 may be at least one storage apparatus located remotely from the foregoing processor 3001. As shown in FIG. 9, the memory 3005 used as a computer storage medium may include an operating system, a network communication module, a user interface module, and a device-control application program.

In the computer device 3000 shown in FIG. 9, the network interface 3004 is mainly configured to perform network communication, the user interface 3003 is mainly configured to provide an input interface for a user, and the processor 3001 may be configured to invoke device-control application program stored in the memory 3005. It is to be understood that the computer device 3000 described in this embodiment of the present disclosure can implement the descriptions of the data processing method in the foregoing embodiment shown in FIG. 3 or FIG. 6, and can also implement the descriptions of the data processing apparatus 1 in the foregoing embodiment shown in FIG. 7, or the data processing apparatus 2 in the foregoing embodiment shown in FIG. 8, and details are not described herein again. In addition, the description of beneficial effects of the same method is not described herein again.

In addition, the embodiments of the present disclosure further provide a computer-readable storage medium. The computer-readable storage medium stores a computer program executed by the data processing apparatus 1 or the data processing apparatus 2. The computer program includes a program instruction. When executing the program instruction, the processor can implement the descriptions of the data processing method in the embodiments shown in FIG. 3 or FIG. 6. Therefore, details are not described herein again. In addition, the description of beneficial effects of the same method is not described herein again. For technical details that are not disclosed in the embodiments of the computer-readable storage medium of the present disclosure, refer to the method embodiments of the present disclosure. In an example, the program instructions may be deployed to be executed on a computing device, or to be executed on a plurality of computing devices at the same location, or to be executed on a plurality of computing devices that are distributed in a plurality of locations The plurality of computing devices that are distributed in the plurality of locations may form a blockchain system.

According to one aspect of the present disclosure, a computer program product or a computer program is provided, the computer program product or the computer program including computer instructions, the computer instructions being stored in a computer-readable storage medium. A processor of a computer device reads the computer instructions from the computer-readable storage medium, and executes the computer instructions, to cause the computer device to implement the descriptions of the data processing method in the embodiment shown in FIG. 3 or FIG. 6, and details are not described herein again. In addition, the description of beneficial effects of the same method is not described herein again.

Figure 10:
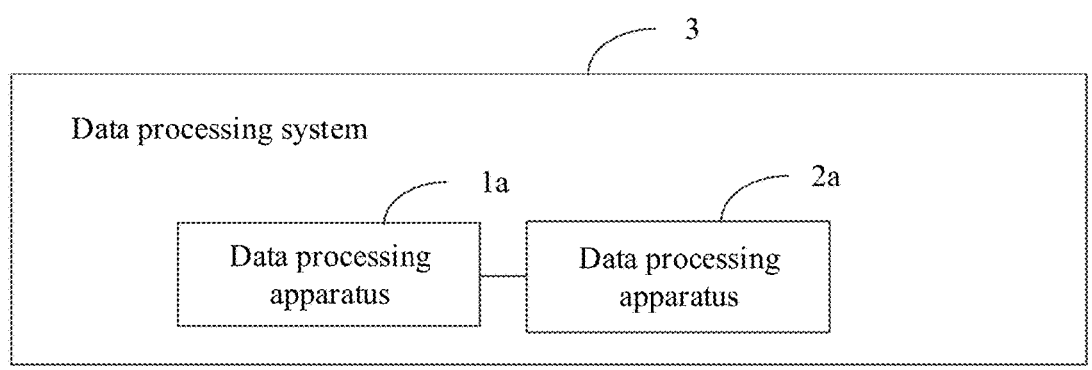
FIG. 10 is a schematic structural diagram of a data processing system according to an embodiment of the present disclosure.

Further, FIG. 10 is a schematic structural diagram of a data processing system according to an embodiment of the present disclosure. The data processing system 3 may include a data processing apparatus 1a and a data processing apparatus 2a. The data processing apparatus 1a may be the data processing apparatus 1 in the embodiment corresponding to FIG. 7. It is to be understood that the data processing apparatus 1a may be integrated to the node 20A (that is the first service node) in the embodiment corresponding to FIG. 2, and therefore, details are not described herein again. The data processing apparatus 2a may be the data processing apparatus 2 in the embodiment corresponding to FIG. 8. It is to be understood that the data processing apparatus 2a may be integrated in the node 20B (that is the second service node) in the embodiment corresponding to FIG. 2, and therefore, details are not described herein again. In addition, the description of beneficial effects of the same method is not described herein again. For technical details that are not disclosed in the data processing system embodiments of the present disclosure, refer to the descriptions of the method embodiments of the present disclosure.

What is disclosed above is merely exemplary embodiments of the present disclosure, and certainly is not intended to limit the protection scope of the present disclosure. Therefore, equivalent variations made in accordance with the claims of the present disclosure shall fall within the scope of the present disclosure.

What is claimed is:

1. A data processing method, performed by a first service node in a blockchain network, the method comprising:

obtaining service data information, and transmitting the service data information to a second service node, the second service node being a node other than the first service node in the blockchain network;

receiving data signature information returned by the second service node, the data signature information being obtained by the second service node through performing signature processing on the service data information; the data signature information comprising a first key parameter and a second key parameter that are both related to a random parameter; the random parameter being determined by the second service node based on both a node private key and the service data information;

performing signature verification on the data signature information based on the first key parameter and the second key parameter in the data signature information, to obtain a signature verification result, and adding the signature verification result to a verification result set associated with the blockchain network;

searching for a signature verification result that satisfies a valid signature verification condition from the verification result set, and determining the signature verification result that satisfies the valid signature verification condition as a target signature verification result; and performing aggregate signature on the data signature information corresponding to the target signature verification result when a quantity of signatures of the target signature verification result satisfies an aggregate signature condition.

2. The method according to claim 1, wherein the obtaining service data information comprises:

obtaining, after a service request transmitted by a user terminal is received, initial service data information to be processed and user signature information carried in the service request, wherein the user signature information is obtained by performing signature processing on the initial service data information based on a user private key corresponding to the user terminal;

obtaining a user public key corresponding to the user private key, and performing signature verification on the user signature information based on the user public key, to obtain a user signature verification result; and using the initial service data information as the service data information when the user signature verification result indicates a signature verification success.

3. The method according to claim 1, wherein the transmitting the service data information to a second service node comprises:

obtaining a node public key of the second service node;

performing encryption processing on the service data information based on the node public key, to obtain encrypted data information; and transmitting the encrypted data information to the second service node.

4. The method according to claim 1, wherein the verification result set comprises a valid result set and an invalid result set; and the performing signature verification on the data signature information based on the first key parameter and the second key parameter in the data signature information, to obtain a signature verification result, and adding the signature verification result to a verification result set associated with the blockchain network comprises:

performing signature verification on the data signature information based on the first key parameter and the second key parameter, to obtain the signature verification result;

adding the signature verification result to the valid result set in the verification result set when the signature verification result is a signature verification success result; and adding the signature verification result to the invalid result set in the verification result set when the signature verification result is a signature verification failure result.

5. The method according to claim 1, wherein the first key parameter is determined by the second service node based on the random parameter and a fixed parameter that is associated with a non-interactive aggregate signature rule; and the second key parameter is determined by the second service node based on the random parameter, the node private key and a verification hash value, wherein the verification hash value is determined by the second service node based on the service data information and the non-interactive aggregate signature rule; and the performing signature verification on the data signature information based on the first key parameter and the second key parameter in the data signature information, to obtain a signature verification result comprises:

obtaining a first auxiliary parameter based on the second key parameter and the fixed parameter;

obtaining a message hash value corresponding to the service data information based on the non-interactive aggregate signature rule; obtaining a second auxiliary parameter based on a node public key of the second service node, the first key parameter and the message hash value; and determining the signature verification result based on the first auxiliary parameter and the second auxiliary parameter.

6. The method according to claim 5, wherein the determining the signature verification result based on the first auxiliary parameter and the second auxiliary parameter comprises:

comparing the first auxiliary parameter with the second auxiliary parameter to obtain a comparison result;

obtaining a signature verification success result corresponding to the data signature information when the comparison result indicates that the first auxiliary parameter is consistent with the second auxiliary parameter;

obtaining a signature verification failure result corresponding to the data signature information when the comparison result indicates that the first auxiliary parameter is inconsistent with the second auxiliary parameter; and determining the signature verification success result or the signature verification failure result as the signature verification result.

7. The method according to claim 1, wherein a quantity of second service nodes in the blockchain network is N, wherein N is a positive integer; one signature verification result in the verification result set is determined by performing signature verification on one piece of data signature information returned by one second service node; and one piece of data signature information comprises: one first key parameter and one second key parameter.

8. The method according to claim 7, wherein the performing aggregate signature on the data signature information corresponding to the target signature verification result when a quantity of signatures of the target signature verification result satisfies an aggregate signature condition comprises:
obtaining a quantity threshold in the aggregate signature condition, and calculating the quantity of signatures of the target signature verification result in the verification result set;
determining that the quantity of signatures satisfies the aggregate signature condition when the quantity of signatures reaches the quantity threshold, wherein the quantity of signatures is n; and n is a positive integer less than or equal to N;
obtaining the first key parameter and the second key parameter in each piece of data signature information from n pieces of data signature information corresponding to n target signature verification results;
performing merging processing on n first key parameters and using the merged n first key parameters as a first aggregate key parameter, and performing merging processing on n second key parameters and using the merged n second key parameters as a second aggregate key parameter; and
performing aggregate signature on the first aggregate key parameter and the second aggregate key parameter based on a non-interactive aggregate signature rule indicated by the aggregate signature condition.

9. A data processing method, performed by a second service node in a blockchain network, the method comprising:
receiving service data information transmitted by a first service node in the blockchain network;
generating, based on a node private key of the second service node and the service data information, a random parameter used for performing signature processing on the service data information;
generating a first key parameter based on the random parameter and a fixed parameter, generating a second key parameter based on the random parameter, the service data information, and the node private key, and determining data signature information based on the first key parameter and the second key parameter; and
transmitting the data signature information to the first service node.

10. The method according to claim 9, wherein the generating, based on a node private key of the second service node and the service data information, a random parameter used for performing signature processing on the service data information comprises:
integrating on the node private key of the second service node and the service data information, to obtain integrated information;
obtaining a hash determination rule in a non-interactive aggregate signature rule, and determining an integration hash value corresponding to the integrated information based on the hash determination rule; and
using the integration hash value as the random parameter.

11. The method according to claim 9, wherein the generating a first key parameter based on the random parameter and a fixed parameter, and generating a second key parameter based on the random parameter, the service data information, and the node private key comprises:
obtaining a fixed parameter associated with a non-interactive aggregate signature rule, and using a first product of the random parameter and the fixed parameter as the first key parameter; and
determining, based on the non-interactive aggregate signature rule, a second product of a verification hash value corresponding to the service data information and the node private key, and performing summation processing on the second product and the random parameter to obtain the second key parameter.

12. The method according to claim 9, further comprising:
receiving aggregate signature information transmitted by the first service node, wherein the aggregate signature information is obtained by the first service node through performing aggregate signature on data signature information corresponding to a target signature verification result; the target signature verification result is a signature verification result that satisfies a valid signature verification condition and is found from a verification result set by the first service node; the signature verification result is determined by the first service node through performing signature verification on the data signature information; and the aggregate signature information comprises a first aggregate key parameter and a second aggregate key parameter;
obtaining a node public key of a second service node associated with the target signature verification result, and performing merging processing on the obtained node public key to obtain a target public key;
obtaining a first aggregate auxiliary parameter based on the second aggregate key parameter and a fixed parameter associated with a non-interactive aggregate signature rule;
obtaining a data hash value corresponding to the service data information based on the non-interactive aggregate signature rule, and obtaining a second aggregate auxiliary parameter based on the target public key, the data hash value, and the first aggregate key parameter; and
determining an aggregate signature verification result corresponding to the aggregate signature information as a valid result when the first aggregate auxiliary parameter is consistent with the second aggregate auxiliary parameter.

13. A data processing apparatus, comprising:
a processor and a memory,
the processor being connected to the memory, the memory being configured to store a computer program, and the processor being configured to invoke the computer program, to cause the computer device to perform:
obtaining service data information, and transmitting the service data information to a second service node, the second service node being a node other than the first service node in the blockchain network;
receiving data signature information returned by the second service node, the data signature information being obtained by the second service node through performing signature processing on the service data information; the data signature information comprising a first key parameter and a second key parameter that are both related to a random parameter; the random parameter being determined by the second service node based on both a node private key and the service data information;

performing signature verification on the data signature information based on the first key parameter and the second key parameter in the data signature information, to obtain a signature verification result, and adding the signature verification result to a verification result set associated with the blockchain network;

searching for a signature verification result that satisfies a valid signature verification condition from the verification result set, and determining the signature verification result that satisfies the valid signature verification condition as a target signature verification result; and performing aggregate signature on the data signature information corresponding to the target signature verification result when a quantity of signatures of the target signature verification result satisfies an aggregate signature condition.

14. The apparatus according to claim 13, wherein the obtaining service data information comprises:

obtaining, after a service request transmitted by a user terminal is received, initial service data information to be processed and user signature information carried in the service request, wherein the user signature information is obtained by performing signature processing on the initial service data information based on a user private key corresponding to the user terminal;

obtaining a user public key corresponding to the user private key, and performing signature verification on the user signature information based on the user public key, to obtain a user signature verification result; and using the initial service data information as the service data information when the user signature verification result indicates a signature verification success.

15. The apparatus according to claim 13, wherein the transmitting the service data information to a second service node comprises:

obtaining a node public key of the second service node;

performing encryption processing on the service data information based on the node public key, to obtain encrypted data information; and transmitting the encrypted data information to the second service node.

16. The apparatus according to claim 13, wherein the verification result set comprises a valid result set and an invalid result set; and the performing signature verification on the data signature information based on the first key parameter and the second key parameter in the data signature information, to obtain a signature verification result, and adding the signature verification result to a verification result set associated with the blockchain network comprises:

performing signature verification on the data signature information based on the first key parameter and the second key parameter, to obtain the signature verification result;

adding the signature verification result to the valid result set in the verification result set when the signature verification result is a signature verification success result; and adding the signature verification result to the invalid result set in the verification result set when the signature verification result is a signature verification failure result.

17. The apparatus according to claim 13, wherein the first key parameter is determined by the second service node based on the random parameter and a fixed parameter that is associated with a non-interactive aggregate signature rule; and the second key parameter is determined by the second service node based on the random parameter, the node private key and a verification hash value, wherein the verification hash value is determined by the second service node based on the service data information and the non-interactive aggregate signature rule; and the performing signature verification on the data signature information based on the first key parameter and the second key parameter in the data signature information, to obtain a signature verification result comprises:

obtaining a first auxiliary parameter based on the second key parameter and the fixed parameter;

obtaining a message hash value corresponding to the service data information based on the non-interactive aggregate signature rule; obtaining a second auxiliary parameter based on a node public key of the second service node, the first key parameter and the message hash value; and determining the signature verification result based on the first auxiliary parameter and the second auxiliary parameter.

18. The apparatus according to claim 17, wherein the determining the signature verification result based on the first auxiliary parameter and the second auxiliary parameter comprises:

comparing the first auxiliary parameter with the second auxiliary parameter to obtain a comparison result;

obtaining a signature verification success result corresponding to the data signature information when the comparison result indicates that the first auxiliary parameter is consistent with the second auxiliary parameter;

obtaining a signature verification failure result corresponding to the data signature information when the comparison result indicates that the first auxiliary parameter is inconsistent with the second auxiliary parameter; and determining the signature verification success result or the signature verification failure result as the signature verification result.

19. The apparatus according to claim 13, wherein a quantity of second service nodes in the blockchain network is N, wherein N is a positive integer; one signature verification result in the verification result set is determined by performing signature verification on one piece of data signature information returned by one second service node; and one piece of data signature information comprises: one first key parameter and one second key parameter.

20. The apparatus according to claim 19, wherein the performing aggregate signature on the data signature information corresponding to the target signature verification result when a quantity of signatures of the target signature verification result satisfies an aggregate signature condition comprises:

obtaining a quantity threshold in the aggregate signature condition, and calculating the quantity of signatures of the target signature verification result in the verification result set;

determining that the quantity of signatures satisfies the aggregate signature condition when the quantity of signatures reaches the quantity threshold, wherein the quantity of signatures is n; and n is a positive integer less than or equal to N;

obtaining the first key parameter and the second key parameter in each piece of data signature information from n pieces of data signature information corresponding to n target signature verification results;

performing merging processing on n first key parameters and using the merged n first key parameters as a first aggregate key parameter, and performing merging processing on n second key parameters and using the merged n second key parameters as a second aggregate key parameter; and performing aggregate signature on the first aggregate key parameter and the second aggregate key parameter based on a non-interactive aggregate signature rule indicated by the aggregate signature condition.

* * * * *